(12) United States Patent
Motoyoshi et al.

(10) Patent No.: US 10,950,904 B2
(45) Date of Patent: Mar. 16, 2021

(54) BATTERY SYSTEM AND ELECTRICALLY DRIVEN VEHICLE EQUIPPED WITH BATTERY SYSTEM

(71) Applicant: SANYO Electric Co., Ltd., Daito (JP)

(72) Inventors: Kenji Motoyoshi, Hyogo (JP); Masato Nishikawa, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 196 days.

(21) Appl. No.: 16/074,969

(22) PCT Filed: Jan. 25, 2017

(86) PCT No.: PCT/JP2017/002431
§ 371 (c)(1),
(2) Date: Aug. 2, 2018

(87) PCT Pub. No.: WO2017/150012
PCT Pub. Date: Sep. 8, 2017

(65) Prior Publication Data
US 2019/0044200 A1 Feb. 7, 2019

(30) Foreign Application Priority Data
Feb. 29, 2016 (JP) .............................. JP2016-037944

(51) Int. Cl.
*H01M 10/613* (2014.01)
*B60L 58/24* (2019.01)
(Continued)

(52) U.S. Cl.
CPC ........... *H01M 10/613* (2015.04); *B60L 50/64* (2019.02); *B60L 58/24* (2019.02); *H01M 2/1077* (2013.01);
(Continued)

(58) Field of Classification Search
CPC ...... B60L 50/64; B60L 58/24; H01M 10/613; H01M 10/625; H01M 10/63;
(Continued)

(56) References Cited

U.S. PATENT DOCUMENTS

2006/0115716 A1* 6/2006 Kim .................. H01M 10/4207
429/120
2009/0142653 A1* 6/2009 Okada ................. H01M 10/613
429/120
(Continued)

FOREIGN PATENT DOCUMENTS

JP 2006-260905 A 9/2006
JP 2011-198713 A 10/2011
(Continued)

OTHER PUBLICATIONS

International Search Report dated May 9, 2017, issued in counterpart application No. PCT/JP2017/002431. (2 pages).

*Primary Examiner* — Adam A Arciero
(74) *Attorney, Agent, or Firm* — Westerman, Hattori, Daniels & Adrian, LLP

(57) ABSTRACT

A battery system having: a series unit in which battery units are connected in series; heat exchangers thermally coupled with the battery units and internally circulating the coolant; and an outer case in which the series units and the heat exchangers are accommodated. The battery unit has battery cells stacked together, a plus output terminal and a minus output terminal at both ends thereof. The battery unit disposed at an end of the plus output terminal side of the series unit is disposed at an inclined posture where the end of the plus output terminal side is away from the base plate of the outer case. The battery unit disposed at an end of the minus output terminal side of the series unit, is disposed at an
(Continued)

inclined posture where the end of the minus output terminal side is away from the base plate of the outer case.

11 Claims, 20 Drawing Sheets

(51) Int. Cl.
| | |
|---|---|
| *B60L 50/64* | (2019.01) |
| *H01M 10/625* | (2014.01) |
| *H01M 10/6568* | (2014.01) |
| *H01M 10/6554* | (2014.01) |
| *H01M 10/6552* | (2014.01) |
| *H01M 2/10* | (2006.01) |
| *H01M 2/34* | (2006.01) |
| *H01M 10/647* | (2014.01) |
| *H01M 2/20* | (2006.01) |
| *H01M 10/63* | (2014.01) |

(52) U.S. Cl.
CPC ............ *H01M 2/34* (2013.01); *H01M 10/625* (2015.04); *H01M 10/6552* (2015.04); *H01M 10/6554* (2015.04); *H01M 10/6568* (2015.04); *H01M 2/206* (2013.01); *H01M 10/63* (2015.04); *H01M 10/647* (2015.04)

(58) Field of Classification Search
CPC ........... H01M 10/647; H01M 10/6552; H01M 10/6554; H01M 10/6568; H01M 2/1077; H01M 2/206; H01M 2/34
See application file for complete search history.

(56) References Cited

U.S. PATENT DOCUMENTS

| | | | |
|---|---|---|---|
| 2013/0130073 A1 | 5/2013 | Kim et al. | |
| 2015/0140373 A1* | 5/2015 | Han | H01M 2/34 |
| | | | 429/61 |
| 2015/0349314 A1 | 12/2015 | Yasui et al. | |

FOREIGN PATENT DOCUMENTS

| | | |
|---|---|---|
| JP | 2012-94376 A | 5/2012 |
| JP | 2014-192044 A | 10/2014 |
| WO | 2014/068880 A1 | 5/2014 |
| WO | 2014/109284 A1 | 7/2014 |

\* cited by examiner

BATTERY SYSTEM AND ELECTRICALLY DRIVEN VEHICLE EQUIPPED WITH BATTERY SYSTEM

TECHNICAL FIELD

The present invention relates to a battery system and an electric vehicle equipped with the battery system. A battery unit having a plurality of battery cells is housed in an outer case, and the battery system cools the battery unit by using a cooling mechanism.

BACKGROUND ART

The battery system of high power which is incorporated in a hybrid vehicle or an electric vehicle, has high current of charging and discharging. As such a battery system is used in many kinds of external conditions, a temperature of the battery cells constituting the battery unit may be increased. The temperature increase of the battery cell causes a life of the battery cell to be decreased. A battery system having a cooling mechanism for suppressing a temperature increase, has been developed. (refer to Patent Literature 1)

The battery system described in Patent Literature 1, includes: a battery unit having a plurality of battery cells; an outer case housing the battery unit; and a cooling plate having a cooling pipe. The battery unit is disposed in a thermal-coupling state with the cooling plate. Then, heat of the battery cells constituting the battery unit, is conducted to the cooling plate. The cooling plate is forcibly cooled through a coolant which circulates in the cooling pipe. As the coolant, many kinds of cooling waters, such as, water, or an antifreeze liquid, can be used. According to the above configuration, the battery system having the cooling mechanism for suppressing a temperature increase, is provided.

CITATION LIST

Patent Literature

Patent Literature 1: Unexamined Japanese Patent Publication No. 2012-94376

SUMMARY OF THE INVENTION

As such a battery system is used in many kinds of external conditions, water may intrude inside the outer case. Additionally, in the battery system having the above-described cooling mechanism, even though the outer case having high sealability is used, water is stored within the outer case by the dew condensation water due to the cooling mechanism or the leakage of cooling water. In a state where the bottom portion of the battery unit is submerged or immersed in water, a short circuit may happen between the battery cells with an electric potential difference through water. Here, when the electric potential difference between the short-circuiting battery cells is large, a large current flows. Then, the problem may happen, that an ignition occurs inside the battery cell or hydrogen gas is generated by electrolyzing cooling water.

The present invention is developed for the purpose of solving such requirements. One of objects of the present invention is to supply a technology which suppresses harmful effects due to submergence within the outer case, with a simple structure.

A battery system of one aspect of the present invention includes: a series unit in which a plurality of battery units are connected in series; a heat exchanger coupled with at least one of the battery units in a thermal-coupling state and internally circulating a coolant; and an outer case housing the series unit and the heat exchanger. Each of the battery units has a plus output terminal and a minus output terminal at both ends of each of the battery units, and includes a plurality of battery cells stacked from the plus output terminal to the minus output terminal. One of the battery units disposed at an end of the plus output terminal side of the series unit, is disposed at an inclined posture where the end of the plus output terminal side is away from a base plate of the outer case. Another of the battery units disposed at an end of the minus output terminal side of the series unit, is disposed at an inclined posture where the end of the minus output terminal side is away from the base plate of the outer case.

According to the above configuration, the battery units disposed at both ends of the plurality of battery units connected in series housed in the outer case, are disposed at an inclined posture where the end of the plus or minus output terminal side is away from the base plate of the outer case. Therefore, this suppresses harmful effects due to submergence, with a voltage difference between the battery units decreased.

An electric vehicle of one aspect of the present invention, has the above battery system. Then, the battery system provides power to a motor which drives the electric vehicle.

According to the above configuration, the vehicle equipped with the battery system, simplifies a structure of the battery system, and suppresses harmful effects due to flooding caused by leakage of coolant circulated in the heat exchanger, and then drives the vehicle safely.

DESCRIPTION OF EMBODIMENTS

An exemplary embodiment of the present invention is described below with reference to the drawings. However, the exemplary embodiment described below shows an example of the present invention, and the battery pack of the present invention is not limited to the following. Further, in the present description, components shown in the scope of claims are not limited to the components of the exemplary embodiment. Furthermore, in the following description, the same names or the same reference marks denote the same components or same type components, and detailed description is appropriately omitted. Further, regarding the elements constituting the present invention, a plurality of elements may be formed of the same component, and one component may serve as the plurality of elements. To the contrary, the function of one component may be shared by the plurality of components.

Embodiment 1

Figure 1:
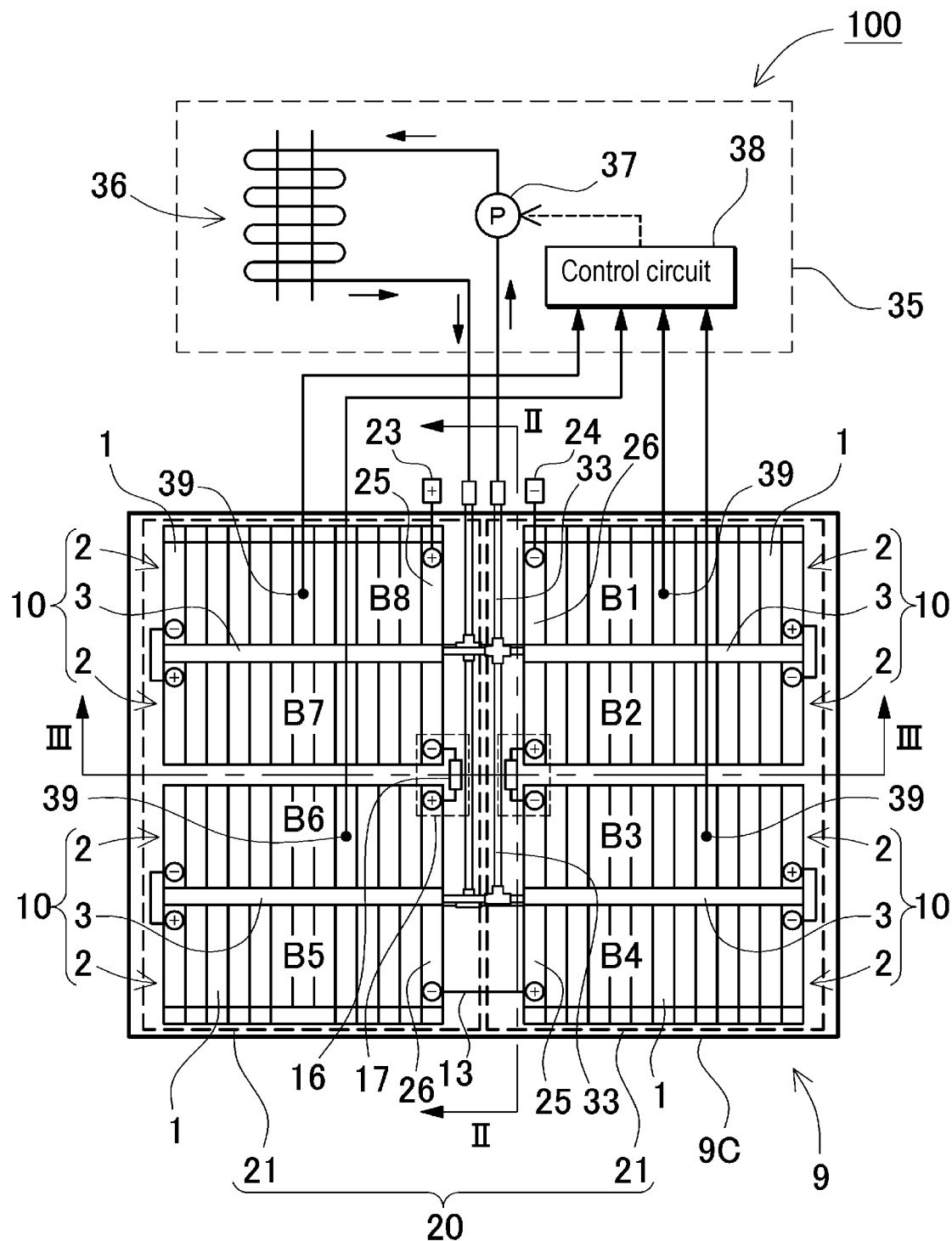
FIG. 1 is a schematic horizontal sectional view of a battery system according to one exemplary embodiment of the present invention.
Figure 2:
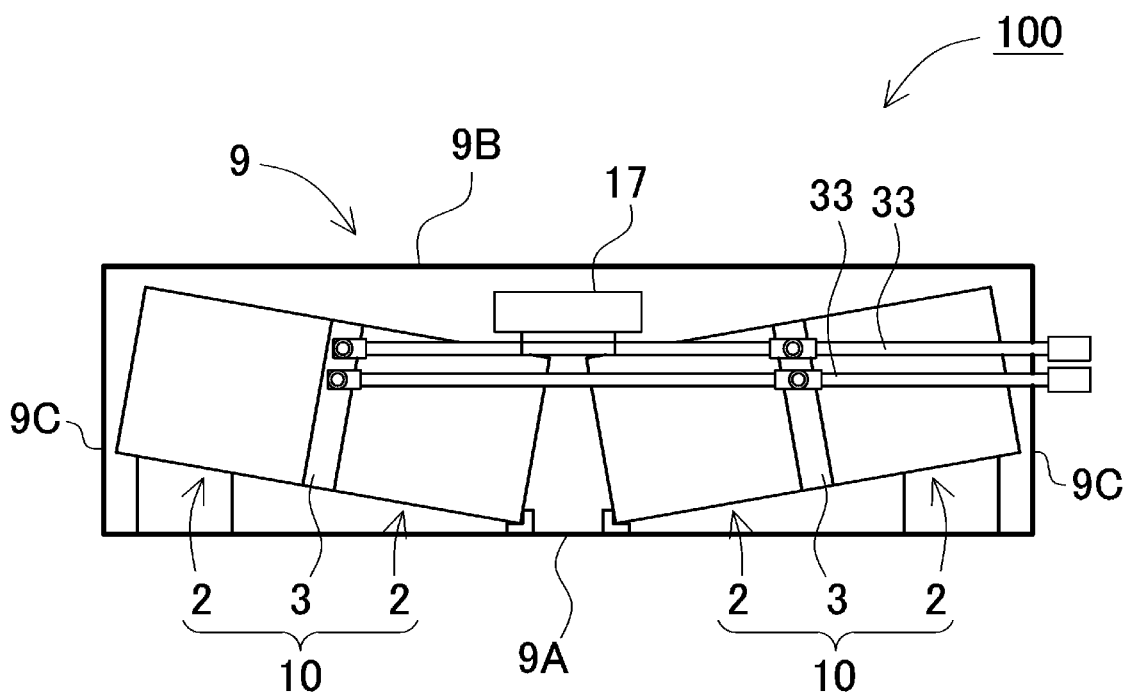
FIG. 2 is a sectional view of the battery system illustrated in FIG. 1 taken along line II-II.
Figure 3:
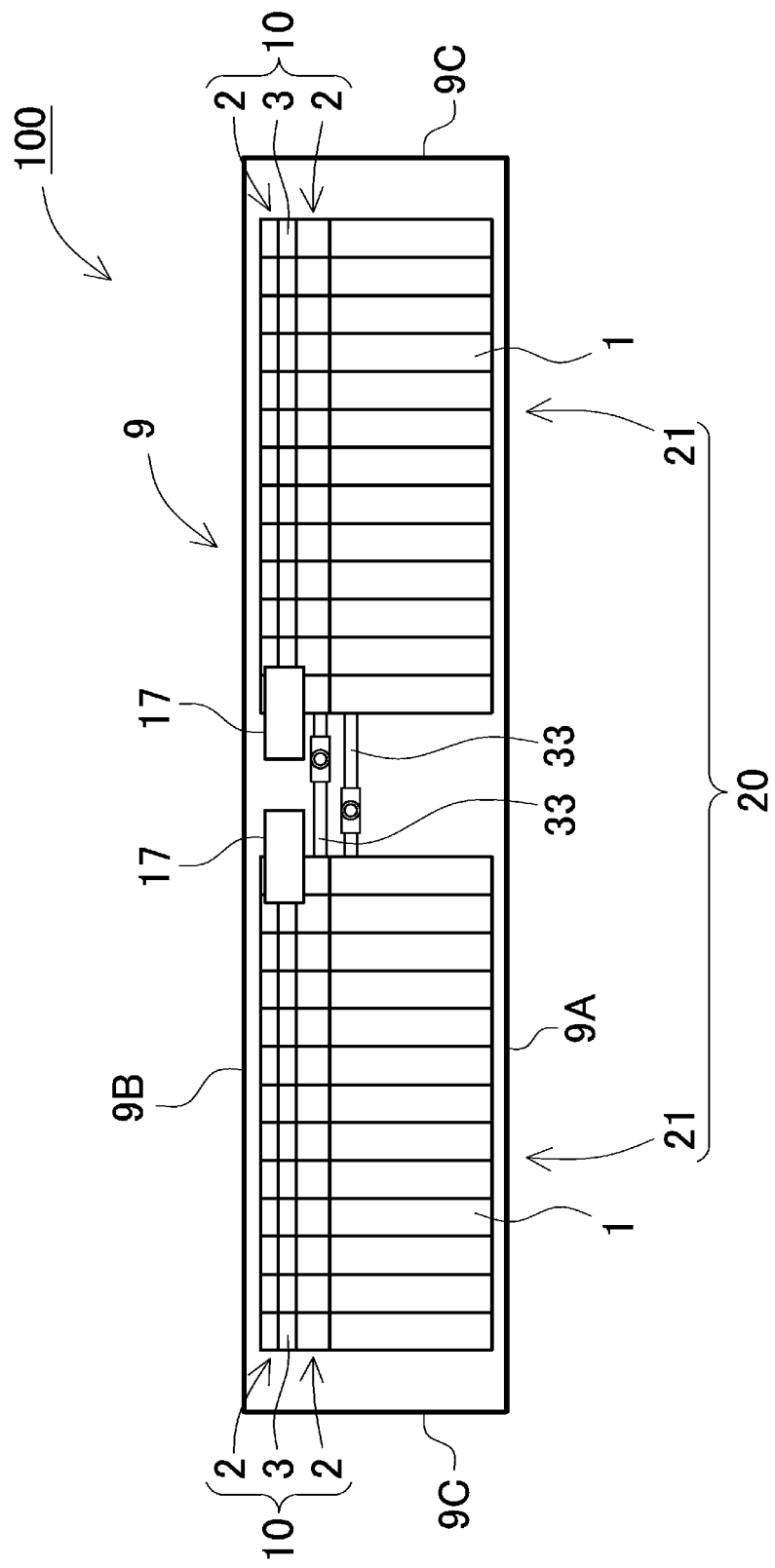
FIG. 3 is a sectional view of the battery system illustrated in FIG. 1 taken along line III-III.

A battery system of FIGS. 1 to 3 is provided with: a plurality of battery units 2 which each have a plurality of battery cells; heat exchangers 3 which are disposed in a thermal-coupling state with this battery units 2, and are cooled by a coolant internally circulated coupled with cooling mechanism 35; and outer case 9 which houses these battery units 2 and heat exchanger 3.

(Battery Unit 2)

Figure 4:
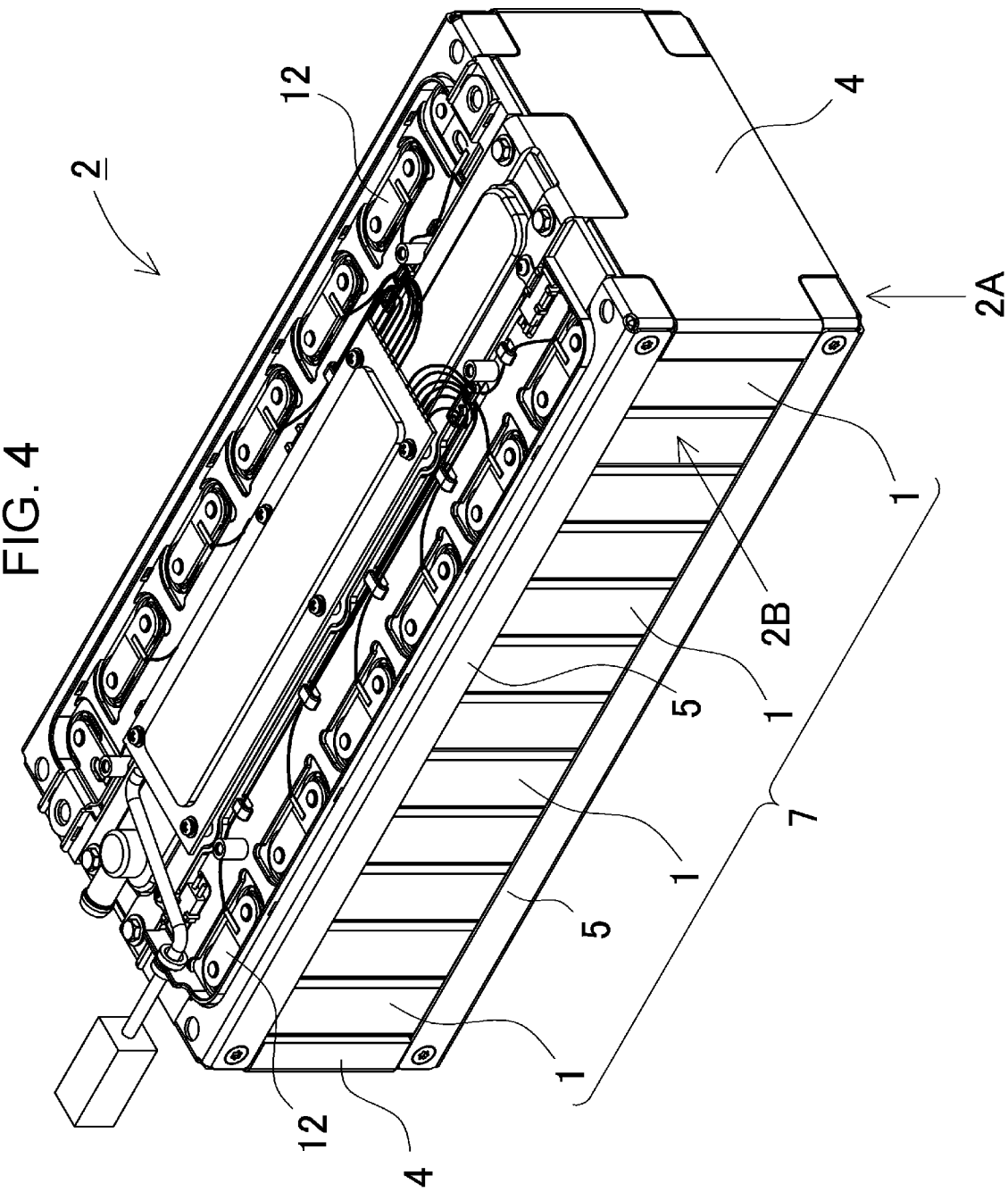
FIG. 4 is a perspective view illustrating one example of a battery unit.
Figure 5:
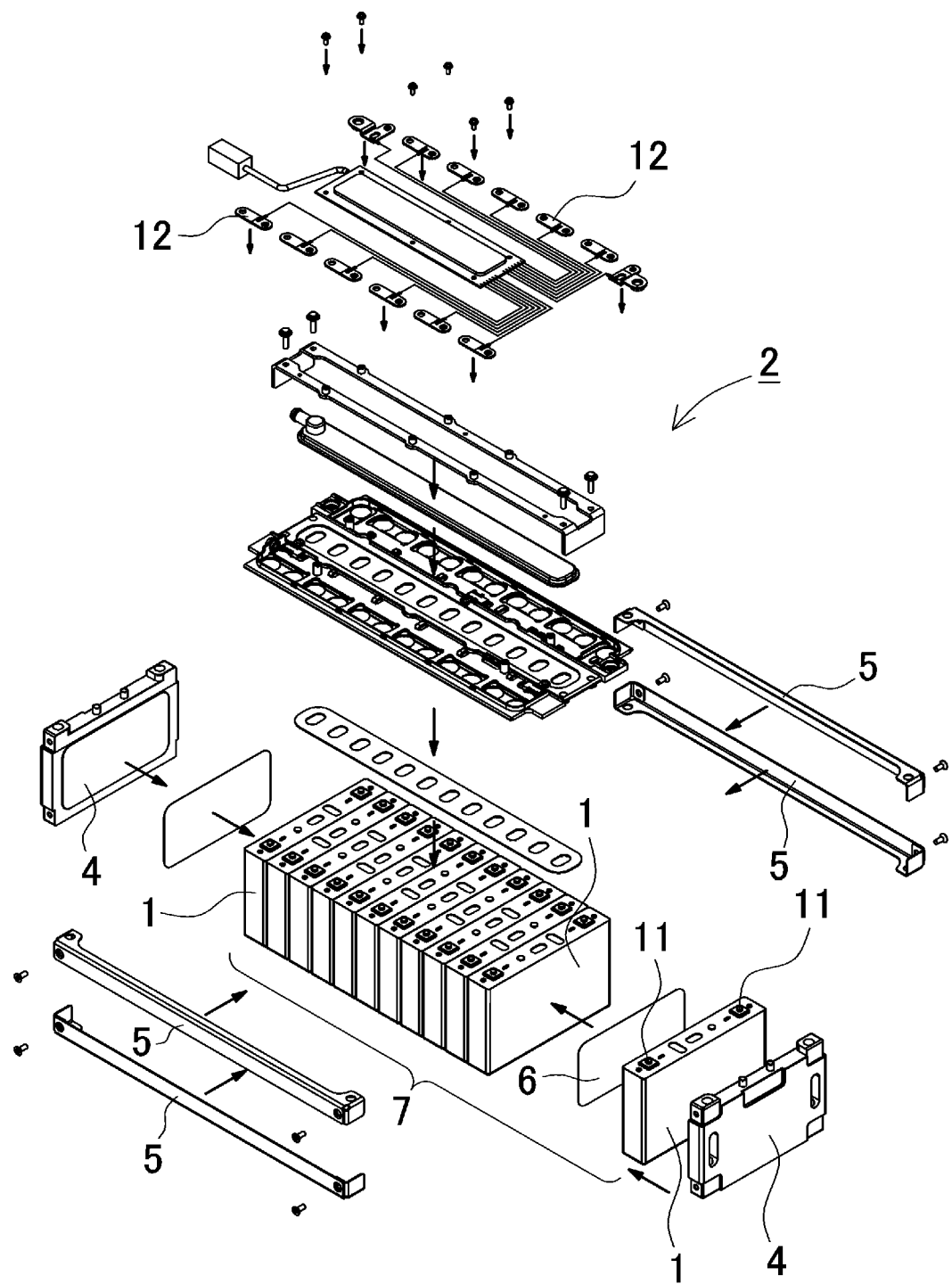
FIG. 5 is an exploded perspective view of the battery unit illustrated in FIG. 4.

As shown in FIGS. 4 and 5, in battery unit 2, a pair of end plates 4 are disposed on both end faces of battery stacked body 7 where the plurality of battery cells 1 are stacked, and then the pair of end plates 4 are coupled by binding bars 5. Both ends of binding bar 5 are fixed at end plates 4, to fix stacked battery cells in a pressed state. Battery cell 1 of the figures is a rectangular parallelepiped battery (prismatic battery). In battery stacked body 7, battery cells 1 are stacked in the thickness direction with insulating separator 6 sandwiched between battery cells 1. Here, in FIGS. 1 to 3, end plates 4 are omitted in order to easily explain.

Battery unit 2 can increase an output voltage and an output by connecting the plurality of stacked battery cells 1 in series. In battery unit 2, bus bars 12 are fixed to electrode terminals 1 of stacked battery cells 1, to connect the plurality of battery cells 1 in series via bus bars 12, or to connect a plurality of parallel-connected cells 1 in series. Accordingly, in this specification, connecting the battery cells in series, means, not only connecting the battery cells in series, but also connecting the battery cells in multi-serial and multi-parallel connection. In battery unit 2, connecting the battery cells 1 in multi-serial and multi-parallel connection, can increase a current of charging and discharging.

In battery unit 2, the number of stacked battery cells 1 and the connecting state are determined so as to make the output voltage of both ends a desired voltage.

(Battery Cell 1)

Battery cell 1 is a chargeable and dischargeable lithium ion secondary battery. However, the battery cell is not limited to the lithium ion secondary battery, and may be any chargeable and dischargeable battery, such as a nickel hydride battery or the like. Battery cell 1 is configured such that the outer can (not shown in figures) which stores an electrode assembly formed by stacking positive and negative electrode plates is filled with an electrolyte, and is sealed in an airtight manner. The opening portion of the outer can is closed by the sealing plate in the airtight manner. The outer can is formed by deep-drawing a metal plate made of aluminum, aluminum alloy, or the like. Positive and negative electrode terminals 11 are fixed at the sealing plate in an insulating manner. The outer can made of metal has a good heat conduction, Bottom surface 2A and side surface 2B as thermal-coupling surfaces in battery units 2, are fixed to surfaces of heat exchanger 3 in a thermal-coupling state.

(Separator 6)

Separator 6 is formed by molding an insulating material such as plastic, to stack battery cells 1 in an insulating manner to each other. Each of insulating separators 6 is sandwiched between adjacent battery cells 1, to insulate adjacent battery cells 1.

(Battery Block 10)

In the battery system, heat exchanger 3 is disposed at bottom surfaces 2A and side surfaces 2B of battery units 2, to cool battery cells 1 of battery units 2. Accordingly, in the battery system, battery block 10 couples battery units 2 to heat exchanger 3 in the thermal-coupling state. Then, this battery block 10 is housed in outer case 9. In battery block 10 shown in FIG. 6, the heat exchanger is disposed at side surfaces 2B of battery units 2 which each have a posture shown in FIG. 4. In battery block 10, the heat exchanger is disposed in a vertical posture between side surfaces 2B of two rows of battery units 2. Then, the battery units are disposed at both surfaces of this heat exchanger in the thermal-coupling state.

However, in a battery block, battery units 2 can be disposed into a state falling-down sideways (not shown in figures) from the posture shown in FIG. 4, and then heat exchanger 3 can be disposed at bottom surfaces 2A of battery units 2. In this battery block 10, the heat exchanger is disposed in a vertical posture between facing bottom surfaces 2A of two rows of battery units 2. Then, the battery units are disposed at both surfaces of heat exchanger 3 in the thermal-coupling state. Further, in a battery block, battery units 2 can be disposed in the posture shown in FIG. 4, and then the heat exchanger can be disposed at bottom surfaces 2A of battery units 2. In this battery block, as will be explained in greater detail below, battery units 2 are disposed at the upper surface of heat exchanger 3 in the thermal-coupling state.

Figure 6:
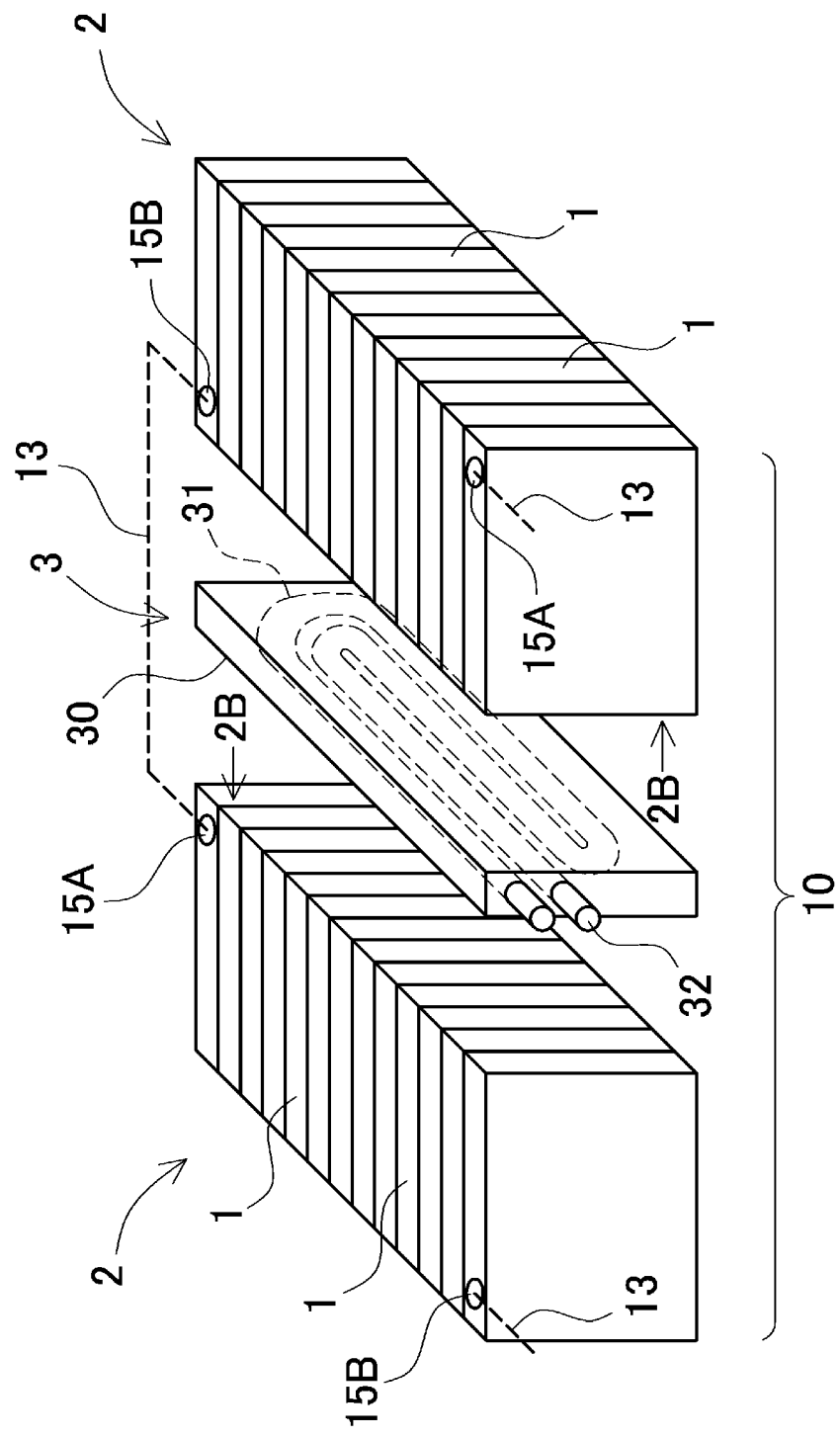
FIG. 6 is a schematic exploded perspective view of a stacked structure of the battery units and a heat exchanger in the battery system illustrated in FIG. 1.

In battery block 10, the arrangement of heat exchanger 3 and battery units 2, or the posture of battery unit 2 are determined, considering a size or a shape of outer case 9 housing battery block 10, or the number of battery units 2 housed in outer case 9. Further, the number or arrangement of battery cells 1 constituting battery unit 2, is changed, depending on an embodiment of battery block 10. For example, as shown in FIG. 6, in the battery unit where is thermally coupled to the heat exchanger in the posture where a terminal surface is horizontal, when all of battery cells 1 are connected in series, the number of battery cells 1 constituting battery unit 2 is made an odd (uneven) number. Additionally, when battery cells 1 are connected in multi-serial and multi-parallel connection, the number of battery cells 1 constituting battery unit 2 is made a multiple of an odd (uneven) number. Therefore, the plus and minus output terminals of battery unit 2 can be disposed in a point symmetry in a plan view. Thus, in battery unit 2 where the output terminals of both ends are disposed in a point symmetry, when a plurality of the battery units are arranged in a parallel posture and are connected in series as shown in FIG. 1, a length of the part which is connected in series can be made short.

In the battery unit where is disposed in a state falling-down sideways where a terminal surface is vertical, when all of battery cells 1 are connected in series, the number of battery cells 1 constituting battery unit 2 is made an even number. Additionally, when battery cells 1 are connected in multi-serial and multi-parallel connection, the number of battery cells 1 constituting battery unit 2 is made a multiple of an even number. Therefore, the plus and minus output terminals of battery unit 2 can be disposed at the same side of the upper side or lower side (for example, the upper side). Thus, the output terminals of battery unit 2 can be disposed at a position where the output terminals are away from the base plate of the outer case. However, in the battery unit, the number or connecting structure of the stacked battery cells is not necessarily limited to the above structure.

(Series Unit 20)

Further, the battery system is provided with series unit 20 in which the plurality of battery units 2 are connected in series. The plurality of battery units 2 are connected in series, by connecting plus and minus output terminals 15 through connecting members 13. A metal plate or a lead wire can be used as connecting member 13. The battery system can increase the output voltage and the output by connecting the plurality of battery units 2 in series.

As shown in FIGS. 1 and 6, in battery block 10 where two pieces of battery units 2 are coupled, two pieces of battery units 2 are disposed at both sides of heat exchanger 3 at a posture where the plus and minus output sides thereof are reverse. Further, the plus and minus output terminals 15 are connected by connecting member 13 at one end, and then, plus output terminal 15A and minus output terminal 15B are disposed at the other end. In addition, battery system 100 of FIG. 1 is provided with series unit 20 in which the plurality of battery blocks 10 are connected in series. While facing plus and minus output terminals 15 of adjacent battery blocks 10, are coupled each other by connecting members 13, the plurality of battery blocks 10 are connected in series. In the battery system shown in FIG. 1, four pieces of battery blocks 10 are disposed in two stages and two columns, and then battery blocks 10 are connected each other in series, to connect eight pieces of battery units 2 in series.

Figure 7:
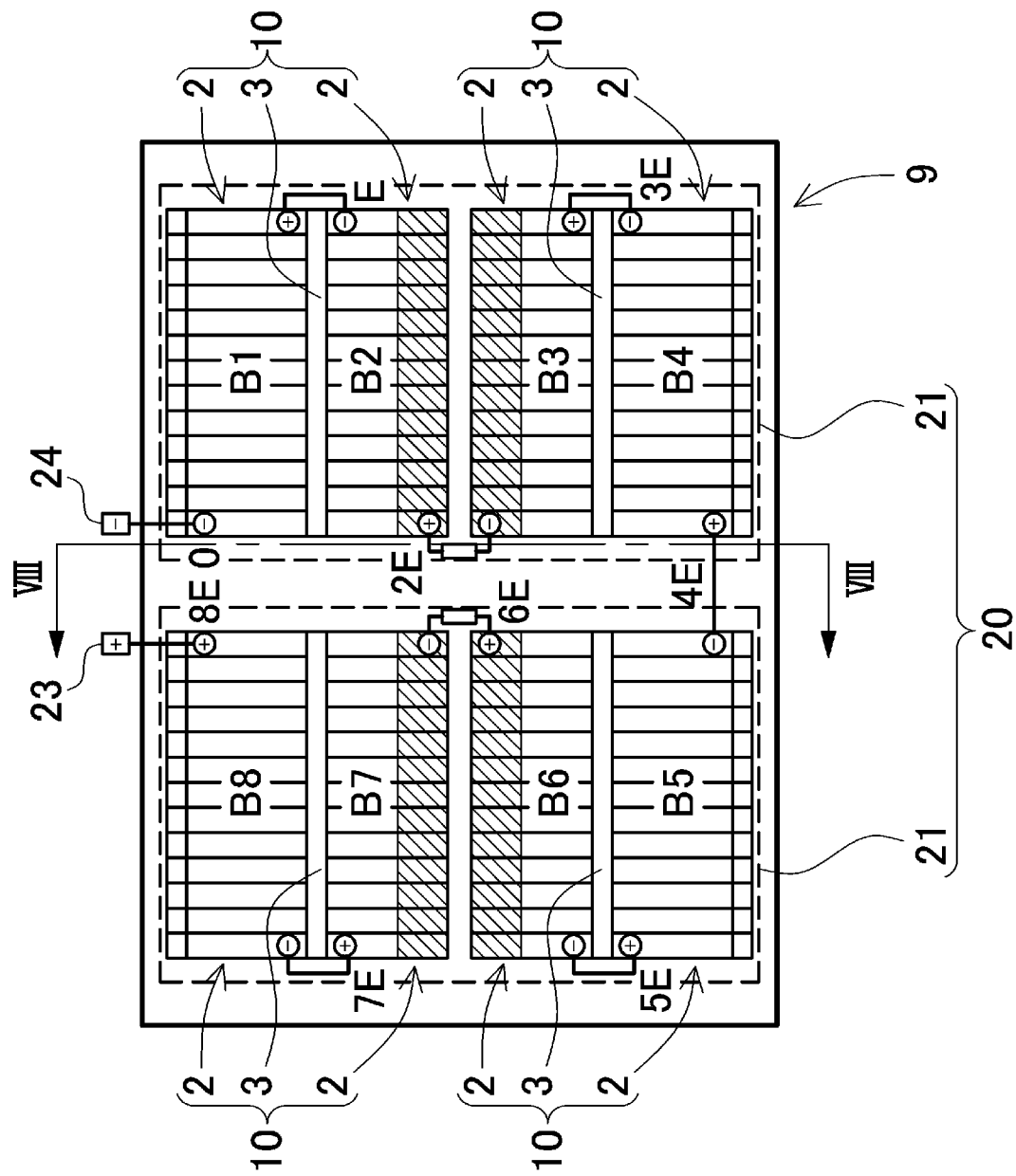
FIG. 7 is a schematic plan view of a connection and submergence state of the battery system illustrated in FIG. 1.

Further, series unit 20 is divided into a plurality of divided units 21 in which the plurality of battery units 2 are connected in series. Series unit 20 shown in the figures is divided into two pieces of divided units 21 which are disposed in the two columns at right and left and each have four pieces of battery units 2. In series unit 20 shown in FIG. 1, in order to connect eight pieces of battery units 2 in series, plus and minus output terminals 15, of eight pieces of battery units 2 constituting four pieces of battery blocks 10, are connected in a predetermined state. In FIG. 7, eight pieces of battery units 2 where marks B1 to B8 are added in the middle portions thereof, are connected in series, in order from minus total output terminal 24 toward plus total output terminal 23. As shown in this figure, in eight pieces of battery units 2, four pieces of battery units 2 which are arranged in each of the columns, are disposed in a posture where the plus and minus output sides thereof are reverse. Then, facing output terminals 15 are connected by connecting members 13, and the four pieces of battery units 2 are connected in series. Further, divided units 21 which are disposed at right and left, are coupled each other by connecting member 13 which is disposed at the low end of the center portion of FIG. 1, to connect all of battery units 2 in series.

Here, as shown in FIG. 7, in the structure where the plurality of battery units 2 are connected in series, a voltage difference between battery units 2 disposed at both ends, is larger than a voltage difference between battery units 2 disposed at the middle. Exactly, in battery units 2 disposed at both ends of series units 20, the voltage difference between battery cell 1 at plus output side of battery unit (B8) disposed at plus side and battery cell 1 at minus output side of battery unit (B1) disposed at minus side, is largest. In this series unit 20, when all of battery units 2 is submerged or immersed, a short-circuit between battery cells at both ends of series unit 20 occurs, and a large short current may flow.

In order to resolve this problem, in the battery system of the present invention, by disposing battery unit 2 which is housed in outer case 9 at a specific inclined posture, the short circuit between battery units 2 having a large voltage difference can be suppressed, while decreasing a voltage difference at a submerged portion at the submergence time. In battery system 100 shown in FIGS. 1 and 3, battery unit 2 disposed at the plus output side of series unit 20, and battery unit 2 disposed at the minus output side of series unit 20, are disposed at inclined postures.

Battery unit (B8) disposed at the end of the plus output terminal side of series unit 20, is disposed at an inclined posture where end 25 of the plus output terminal side is away from base plate 9A of outer case 9. In battery system 100 shown in FIGS. 1 to 3, the two pieces of battery units (B8, B7) disposed at the plus output side of series unit 20 are coupled, to constitute battery block 10. Then, in the inclined posture, whole battery unit (B8) at the plus side as a side portion of one side of this battery block 10, is higher than the other battery unit (B7). Thus, battery unit (B8) disposed at the plus output side is disposed at the inclined posture where the whole battery unit including battery cell 1 disposed at end 25 of the plus output terminal side is away from base plate 9A of outer case 9.

In the same way, battery unit (B1) disposed at the end of the minus output terminal side of series unit 20, is disposed at an inclined posture where end 26 of the minus output terminal side is away from base plate 9A of outer case 9. In the battery system shown in FIGS. 1 to 3, the two pieces of battery units (B1, B2) disposed at the minus output side of series unit 20 are coupled, to constitute battery block 10. Then, in the inclined posture, whole battery unit (B1) at the minus side as a side portion of one side of this battery block 10, is higher than the other battery unit (B2). Thus, battery unit (B1) disposed at the minus output side is disposed at the inclined posture where the whole battery unit including battery cell 1 disposed at end 26 of the minus output terminal side is away from base plate 9A of outer case 9.

Further, in series units 20 shown in the figures, in each of divided units 21 each including four pieces of battery units 2, battery unit (B8, B4) disposed at the plus output side of each of divided units 21, and battery unit (B5, B1) disposed at the minus output side of each of divided units 21, are disposed at the inclined posture in the same way as the above-mentioned battery unit (B8, B1). Namely, in FIG. 1, in each of divided units 21 disposed in the two columns at right and left, two pieces of battery units (B8, B5) (B1, B4) positioned in the upper side and lower side, are higher than two pieces of battery units (B7, B6) (B2, B3) positioned in the middle, and are disposed at the inclined posture where upper or lower battery unit (B8, B5, B1, B4) is away from base plate 9A of outer case 9. Namely, among the eight pieces of battery units 2 which are connected in series in series unit 20 shown in the figures, first and eighth battery units (B1, B8) positioned at both ends, and fourth and fifth battery units (B4, B5) positioned at the middle, are disposed at the inclined posture where the battery unit is away from base plate 9A of outer case 9.

Figure 8:
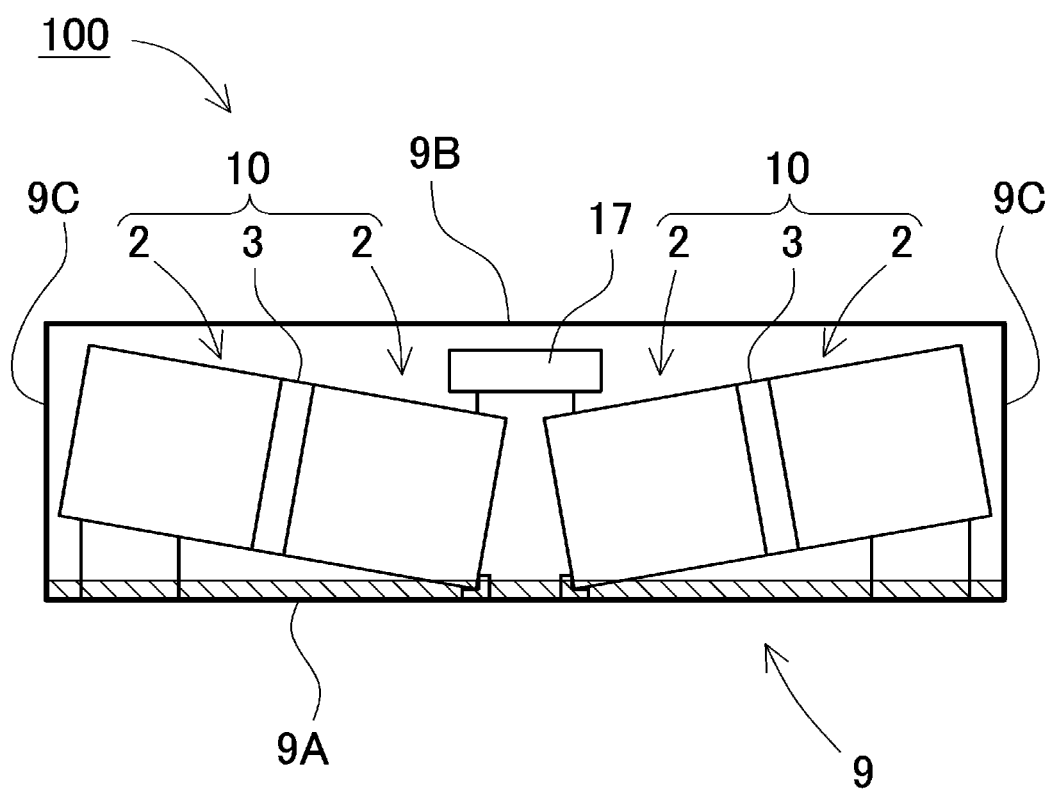
FIG. 8 is a schematic sectional view of a submergence state of the battery system illustrated in FIG. 2.

In battery system 100 where the plurality of battery units 2 are disposed in these postures, in a state where the bottom portion of outer case 9 is submerged or immersed as shown in FIG. 8, battery units 2 are submerged or immersed in a region which extends in the right and left direction along the middle portion of the front-back direction, as shown by hatching in FIG. 7. In this case, as shown in FIG. 7, when the output voltage of each of battery units 2 is E (V), the whole output voltage is 8E (V) in the state where the eight pieces of battery units 2 are connected in series. Then, the maximum voltage difference in the region shown by hatching in FIG. 7, is 7E−E=6E (V). Therefore, the maximum voltage difference at the time of submergence can be made small, compared with a maximum voltage difference 8E (V) of the whole of series unit 20.

Further, in series unit 20 in which the plurality of battery units 2 are connected in series, current cut element 16 as a protection element is disposed at a middle of series unit 20. Current cut element 16 is a protection element for protecting the battery, by cutting a current in a case where a large current flows through an electric circuit. Then, a fuse or a relay can be used as current cut element 16. In battery system 100 shown in the figures, current cut elements 16 are connected between battery units 2 connected in series. Further, in battery system 100 shown in FIGS. 2 and 3, housing boxes 17 which each house current cut element 16, are respectively disposed at gaps formed between top plate 9B of outer case 9 and battery units 2 disposed at the inclined postures, inside outer case 9. In this structure, the dead space which is made within outer case 9, can be used effectively, to arrange current cut element 16. Especially, since housing boxes 17 housing current cut elements 16 are disposed at the upper side, current cut element 16 of the protection element can be disposed at a safe location.

(Heater Exchanger 3)

Heat exchangers 3 are respectively coupled to the thermal-coupling surface of each of battery cells 1, to cool each of battery cells 1. Heat exchanger 3 includes: cooling pipe 31 in which a coolant circulates as circulating path; and cooling plate 30 which incorporates this cooling pipe 31. Cooling plate 30 is cooled through a coolant which circulates in cooling pipe 31. In heat exchanger 3 of FIG. 6, cooling pipe 31 made of stainless is buried in cooling plate 30 made of aluminum. Coupling end portions 32 as both ends portions of cooling pipe 31, are extended from cooling plate 30. Then, through coupling end portions 32, the coolant is circulated inside.

In heat exchanger 3 shown in FIG. 6, the pair of coupling end portions 32 project in the horizontal direction from the end surface of cooling plate 30. Additionally, a pair of coupling end portions 32 can project in any one of different directions from cooling plate 30, depending on a connecting structure to battery units 2 constituting battery block 10 or an arrangement of battery block 10 described below. In heat exchanger 3 shown in FIG. 6, for example, a pair of coupling end portions 32 can project below from cooling plate 30.

In above heat exchanger 3, cooling plate 30 is cooled through a coolant which circulates in cooling pipe 31. Cooling plate 30 is disposed in a thermal-coupling state with battery units 2, to cool battery cells 1. Thus, in heat exchanger 3 which incorporates cooling pipe 31 in which a coolant circulates, coolant leakage inside heat exchanger 3 can be prevented surely. Additionally, in heat exchanger 3 where cooling pipe 31 is buried in cooling plate 30, cooling pipe 31 and cooling plate 30 are excellent in heat conductivity, and cooling plate 30 is efficiently cooled by the coolant which circulates in cooling pipe 31. Further, cooling plate 30 which is board-shaped and made of metal, has large thermal capacity, and cooling plate 30 can efficiently absorb heat generation of battery cell 1, to restrict temperature increase of battery cell 1. Also after stopping circulating the coolant, battery cell 1 can be cooled. Here, in the present invention, the structure of the heat exchanger is not limited to the above-mentioned structure. For example, the heat exchanger includes any one of the structures where a surface can be cooled by the circulating coolant, for example, such as, a structure where a cooling pipe is fixed on a metal board, or a structure where a cooling pipe is disposed between two sheets of metal boards.

Heat exchanger 3 is disposed in a thermal-coupling state where cooling plate 30 is coupled to battery cells 1 of battery units 2, inside outer case 9. As shown in FIGS. 1 to 3, the plurality of heat exchangers 3 disposed within outer case 9, are coupled to cooling mechanism 35 through coolant pipes 33. Coolant pipe 33 is a pipe made of metal. Here, the coolant pipe is not necessarily limited to the metal pipe. Any one of all structures which circulate the coolant, such as, a hose made of a material having rubber elasticity, or the like, can be used as the coolant pipe. Accordingly, in this specification, the word of "pipe" is used as the word having wide meaning which includes a hose.

(Cooling Mechanism 35)

Cooling mechanism 35 cools by circulating the coolant to heat exchanger 3 through coolant pipes 33 As shown in FIG. 1, cooling mechanism 35 includes: heat exchanger 36 which cools the coolant; circulating pump 37 which circulates the coolant cooled by this heat exchanger 36; and control circuit 38 which controls driving of circulating pump 37 while detecting battery temperature of battery unit 2. This cooling mechanism 35 controls cooling state of heat exchanger 3, while control circuit 38 controls driving of circulating pump 37 with battery temperature detected by temperature sensor 39. When the battery temperature exceeds a predetermined temperature, control circuit 38 starts driving of circulating pump 37. After starting driving of circulating pump 37, the coolant is circulated in heat exchanger 3, to cool this heat exchanger 3. When the battery temperature becomes lower than the predetermined temperature, control circuit 38 stops driving of circulating pump 37. In this state, the coolant is not circulated to heat exchanger 3, and heat exchanger 3 is not forcibly cooled. Control circuit 38 stores the predetermined temperature of driving of circulating pump 37, and controls driving of circulating pump 37 by the predetermined temperature, and controls the battery temperature within the predetermined range.

(Outer Case 9)

Outer case 9 is substantially box-shaped, and the box shape includes: base plate 9A disposed at the bottom surface: top plate 9B disposed at the top surface; surrounding walls 9C which are along the periphery of base plate 9A and top plate 9B. Outer case 9 has a housing space for battery blocks 10 inside. In outer case 9, a case body has a container shape including base plate 9A and surrounding walls 9C, and has an upper opening. Then, the upper opening is closed by a lid, and the inner space is closed. Preferably, this outer case 9 has a sealed structure which does not ventilate the inside with outer air. Therefore, it does not happen that a water droplet is produced by dew condensation through intruding of outer air on the surface of heat exchanger 3 in this outer case 9. Thus, there is no water droplet, or almost no water droplet on the surface of heat exchanger 3. Further, even though the coolant circulating in heat exchanger 3 leaks inside, outer case 9 has the sealed structure where leaking coolant does not go outside. The battery system where the leaking coolant does not go outside, can be disposed in the cabin of the vehicle. Additionally, since water does not intrude into the battery system, the battery system can be disposed at the outer side of the vehicle.

Embodiment 2

Figure 9:
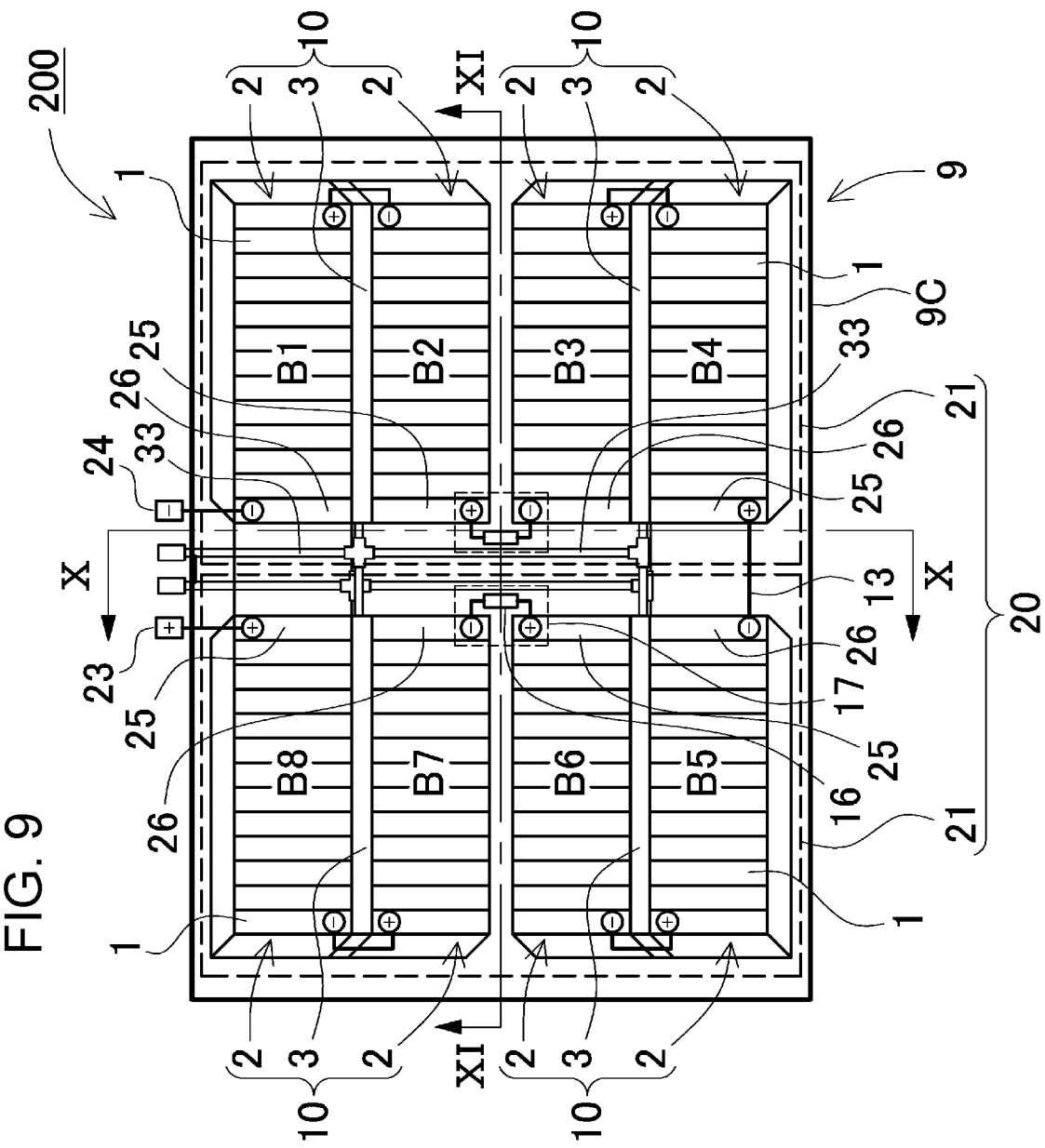
FIG. 9 is a schematic horizontal sectional view of a battery system according to another exemplary embodiment of the present invention.
Figure 10:
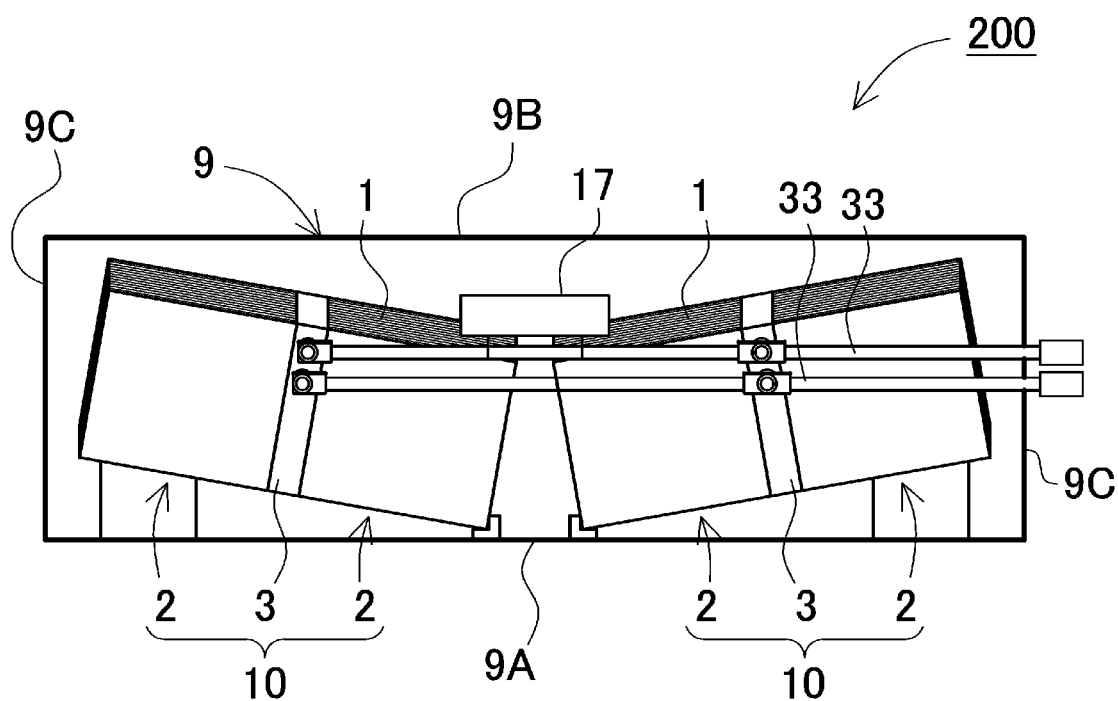
FIG. 10 is a sectional view of the battery system illustrated in FIG. 9 taken along line X-X.
Figure 11:
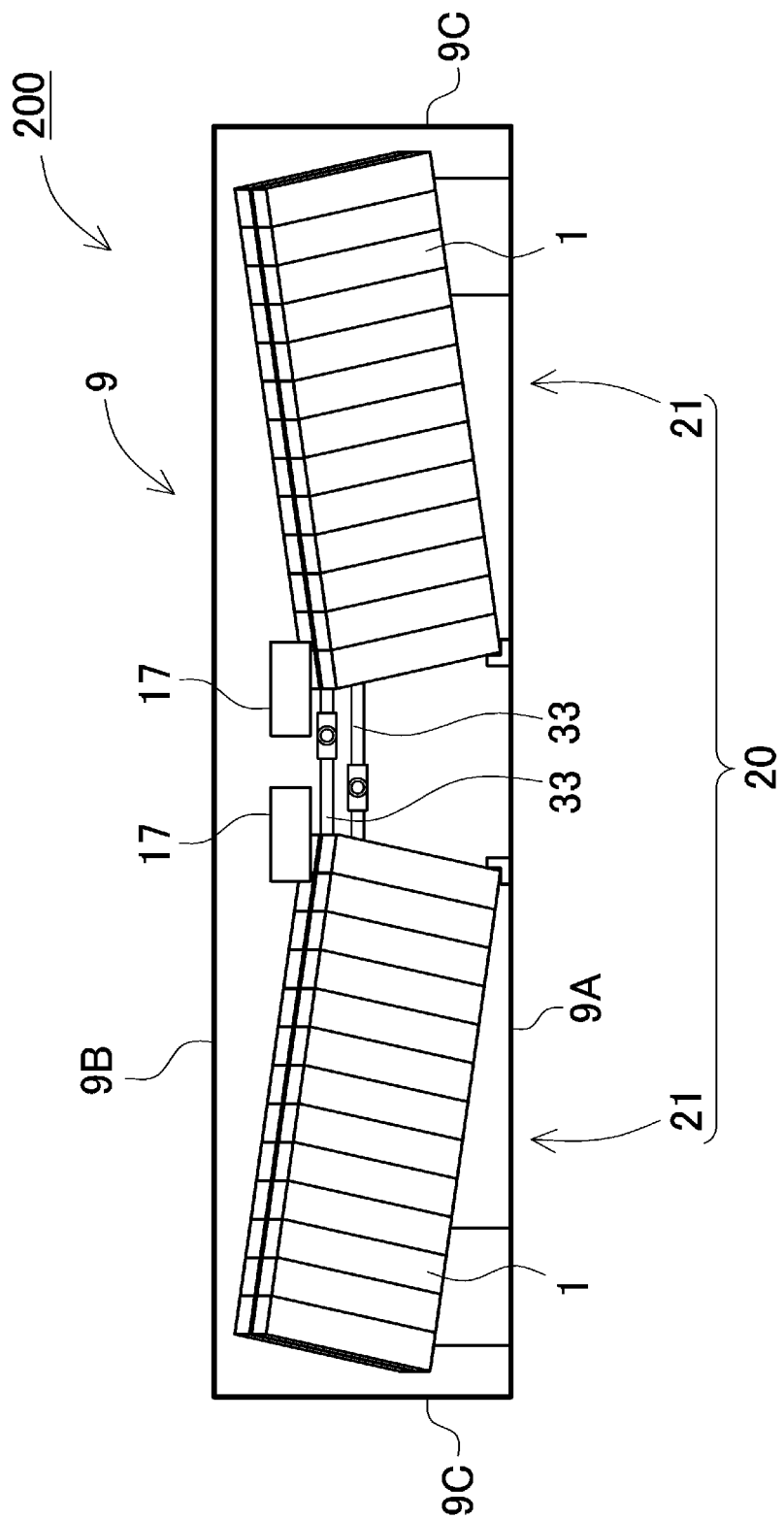
FIG. 11 is a sectional view of the battery system illustrated in FIG. 9 taken along line XI-XI.

Further, as shown in FIGS. 9 to 11, in the battery system, battery unit 2 which is housed in outer case 9, can be disposed at a specific inclined posture. In battery system 200 shown in these figures, four pieces of battery blocks 10 are disposed in the same connecting state as above-mentioned battery system 100, but the inclined posture of each of battery blocks 10 is different from the above-mentioned embodiment. In battery system 200, each of battery blocks 10 is inclined in the right and left direction and in the front-back direction. Then, in each of battery blocks 10, three corners including the ends of the plus and minus output sides are elevated and away from base plate 9A of outer case 9.

In battery system 200 shown in FIGS. 9 to 12, the two pieces of battery units (B8, B7) disposed at the plus output side of series unit 20 are coupled, to constitute battery block 10. In the plan view (refer to FIG. 9), battery block 10 including battery units (B8, B7) is disposed at the inclined posture, where the three corners of the upper right, upper left, and lower left, are elevated to the corner of the lower right. Then, the three corners are away from base plate 9A of outer case 9. The three corners includes both ends of battery unit (B8) disposed at the plus output terminal side, and the plus output terminal (15A) of the other battery unit (B7). In this battery block 10, the minus output terminal 15B of the other battery unit (B7) is near base plate 9A of outer case 9. This battery block 10 is disposed at the inclined posture of the upslope from this corner toward the other three corners.

In the same way, in battery system 200, the two pieces of battery units (B1, B2) disposed at the minus output side of series unit 20 are coupled, to constitute battery block 10. In the plan view (refer to FIG. 9), battery block 10 including battery units (B1, B2) is disposed at the inclined posture, where the three corners of the upper right, upper left, and lower right, are elevated to the corner of the lower left. Then, the three corners are away from base plate 9A of outer case 9. The three corners includes both ends of battery unit (B1) disposed at the minus output terminal side, and the minus output terminal (15B) of the other battery unit (B2). In this battery block 10, the plus output terminal 15A of the other battery unit (B2) is near base plate 9A of outer case 9. This battery block 10 is disposed at the inclined posture of the upslope from this corner toward the other three corners.

Further, in series units 20 shown in the figures, in each of divided units 21 each including four pieces of battery units 2, battery unit (B8, B4) disposed at the plus output side of each of divided units 21, and battery unit (B5, B1) disposed at the minus output side of each of divided units 21, are disposed at the inclined posture in the same way as the above-mentioned battery unit (B8, B1). Namely, in FIG. 9, the two pieces of battery units (B6, B5) disposed at the minus side of divided unit 21 arranged in the left column are coupled, to constitute battery block 10. In the plan view (refer to FIG. 9), battery block 10 including battery units (B6, B5) is disposed at the inclined posture, where the three corners of the upper left, lower left, and lower right, are elevated to the corner of the upper right. Then, the three corners are away from base plate 9A of outer case 9. The three corners includes both ends of battery unit (B5) disposed at the minus output terminal side, and the minus output terminal (15B) of the other battery unit (B6). In this battery block 10, the plus output terminal 15A of the other battery unit (B6) is near base plate 9A of outer case 9. This battery block 10 is disposed at the inclined posture of the upslope from this corner toward the other three corners.

Additionally, in FIG. 9, the two pieces of battery units (B3, B4) disposed at the plus side of divided unit 21 arranged in the right column are coupled, to constitute battery block 10. In the plan view (refer to FIG. 9), battery block 10 including battery units (B3, B4) is disposed at the inclined posture, where the three corners of the upper right, lower right, and lower left, are elevated to the corner of the upper left. Then, the three corners are away from base plate 9A of outer case 9. The three corners includes both ends of battery unit (B4) disposed at the plus output terminal side, and the plus output terminal (15A) of the other battery unit (B3). In this battery block 10, the minus output terminal 15B of the other battery unit (B3) is near base plate 9A of outer case 9. This battery block 10 is disposed at the inclined posture of the upslope from this corner toward the other three corners.

Figure 12:
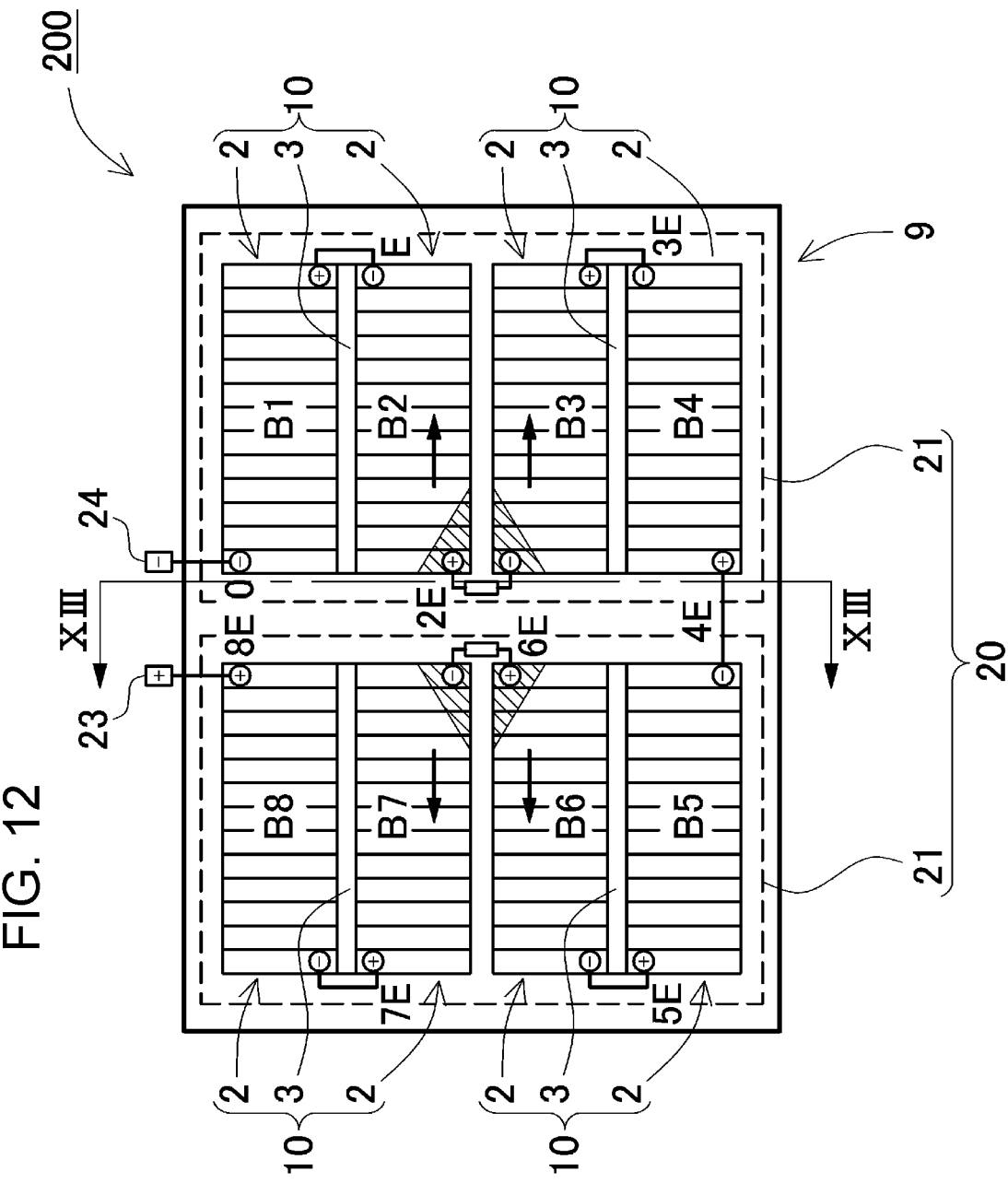
FIG. 12 is a schematic plan view of a connection and submergence state of the battery system illustrated in FIG. 9.
Figure 13:
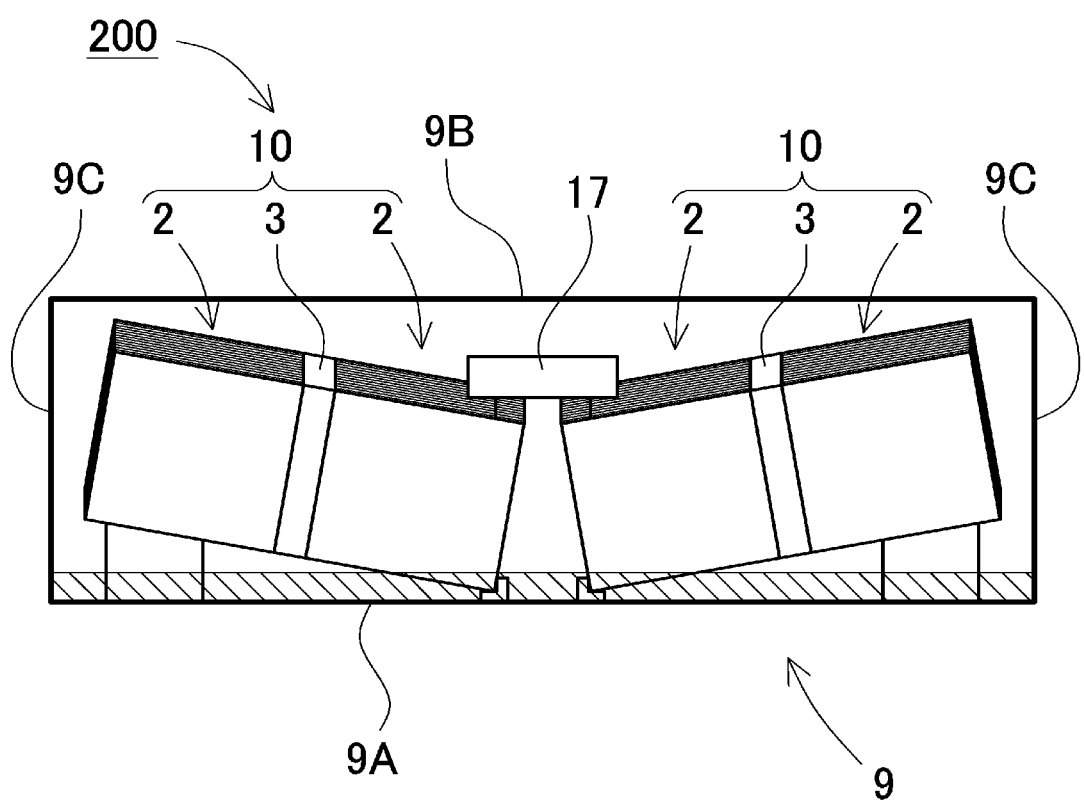
FIG. 13 is a schematic sectional view of a submergence state of the battery system illustrated in FIG. 10.

In battery system 200 where the plurality of battery units 2 are disposed in these postures, in a state where the bottom portion of outer case 9 is submerged or immersed as shown in FIG. 13, battery units 2 are submerged or immersed in a region which extends in the right and left direction and the front-back direction from the center portion of the bottom plate, as shown by hatching in FIG. 12. For example, in battery block 10 including the two pieces of battery units (B8, B7) located at the upper left in FIG. 12, battery block 10 is submerged or immersed in a region which has a triangle shape including the lower right corner of battery block 10, as shown by hatching in the figure. In this case, as shown in FIG. 12, when the output voltage of each of battery units 2 is E (V), the whole output voltage is 8E (V) in the state where the eight pieces of battery units 2 are connected in series. Then, the maximum voltage difference in the region shown by hatching in FIG. 12, is 4E to 5E (V). Therefore, the maximum voltage difference at the time of submergence can be made small, compared with a maximum voltage difference 8E (V) of the whole of series unit 20.

Additionally, when this battery block is further submerged or immersed, the submerged region shown by hatching in the figure is enlarged in directions shown by arrows. Namely, in battery block 10 including the two pieces of battery units (B8, B7) located at the upper left in FIG. 12, the submergence is advanced in a direction where a voltage is increased. Namely, in battery block 10 including the two pieces of battery units (B1, B2) located at the upper right in FIG. 12, the submergence is advanced in a direction where a voltage is decreased. Therefore, at the time of submergence, the maximum voltage difference becomes large with the elapse of time. Thus, an abrupt short circuit by a large maximum voltage difference can be effectively prevented.

Embodiment 3

Figure 14:
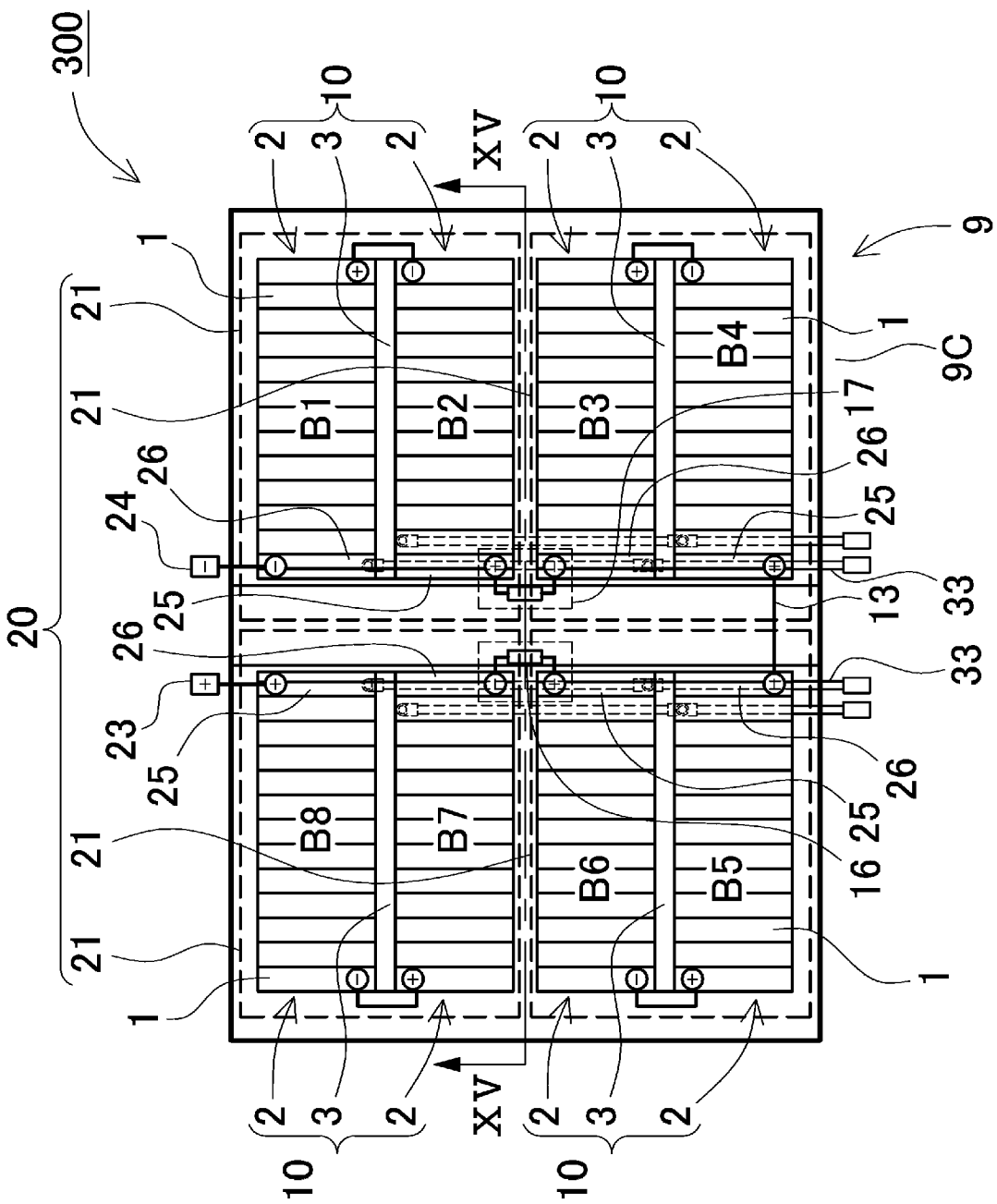
FIG. 14 is a schematic horizontal sectional view of a battery system according to further another exemplary embodiment of the present invention.
Figure 15:
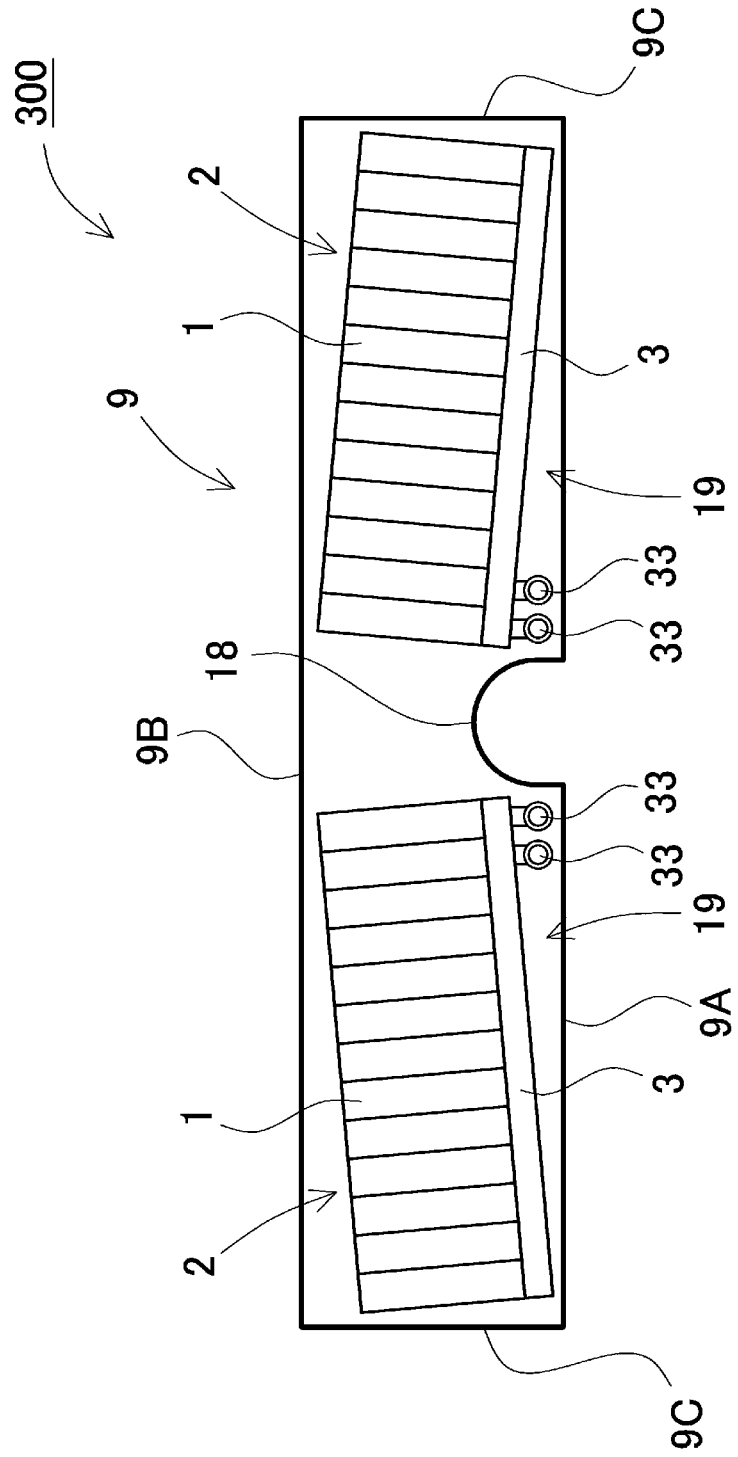
FIG. 15 is a sectional view of the battery system illustrated in FIG. 14 taken along line XV-XV.
Figure 16:
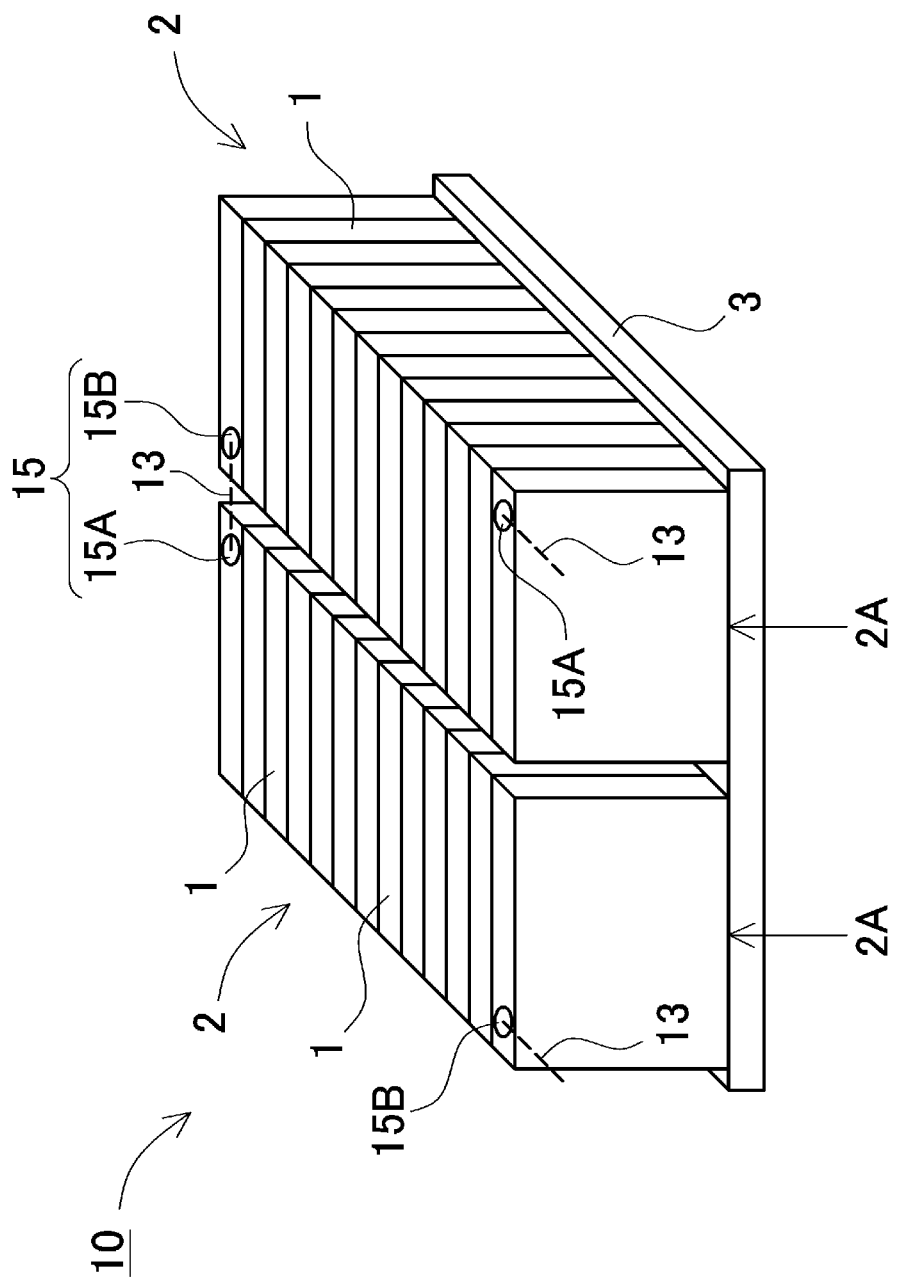
FIG. 16 is a schematic perspective view of a stacked structure of the battery units and a heat exchanger in the battery system illustrated in FIG. 14.

Further, the battery system can have a structure shown in FIGS. 14 to 16. In the battery system shown in the figures, the four pieces of the battery blocks which are housed in the outer case, has a different structure from the above-mentioned embodiments. As shown in FIG. 16, in battery block 10, two pieces of battery units 2 are arranged on the upper surface of heat exchanger 3. Then, heat exchanger 3 is disposed in the thermal-coupling state with the bottom surface 2A of battery units 2. Further, battery system 300 is provided with series unit 20 in which the eight pieces of battery units 2 are connected in series with the four battery blocks connected in series.

Figure 17:
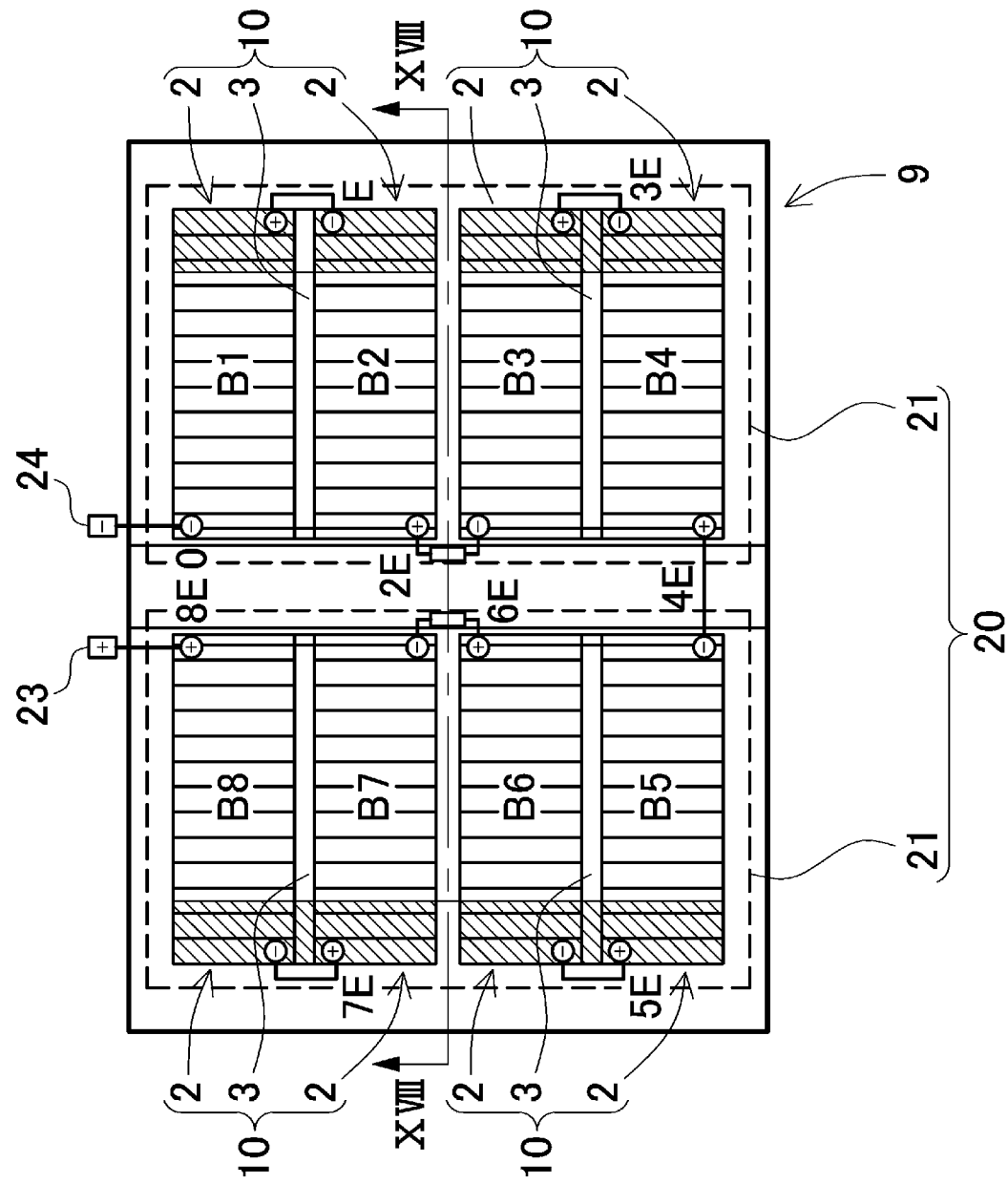
FIG. 17 is a schematic plan view of a connection and submergence state of the battery system illustrated in FIG. 14.

Further, series unit 20 is divided into a plurality of divided units 21 in which the plurality of battery units 2 are connected in series. Series unit 20 shown in the figures is divided into four pieces of divided units 21. One divided unit 21 has one battery block 10 which includes two pieces of battery units 2. In series unit 20 shown in FIG. 1, plus and minus output terminals 15, of eight pieces of battery units 2 constituting four pieces of battery blocks 10, are connected in a predetermined state, in the same way as the above-mentioned battery system. This connecting state is shown in FIG. 17. In this figure, eight pieces of battery units 2 where marks B1 to B8 are added in the middle portions thereof, are connected in series, in order from minus total output terminal 24 toward plus total output terminal 23. In eight pieces of battery units 2, two pieces of battery units 2 are disposed in a posture where the plus and minus output sides thereof are reverse, to constitute battery block 10. Then, facing output terminals 15 are connected, and the four pieces of battery blocks 10 are connected in series.

Battery unit (B8) disposed at the end of the plus output terminal side of series unit 20, is disposed at an inclined posture where end 25 of the plus output terminal side is away from base plate 9A of outer case 9. In battery system 300 shown in FIGS. 14 to 16, the two pieces of battery units (B8, B7) disposed at the plus output side of series unit 20 are arranged side by side, to constitute battery block 10. Battery unit (B8) disposed at the plus side, is disposed at an inclined posture where end 25 of the plus output terminal side is away from base plate 9A of outer case 9. Therefore, battery unit (B8) arranged side by side, is also disposed at an inclined posture where end 26 of the minus output terminal side is away from base plate 9A of outer case 9. Namely, this battery block 10 is disposed at the inclined posture where the one side portion of this battery block 10 is elevated. The one side portion has both of end 25 of the plus output terminal side and end 26 of the minus output terminal side.

In the same way, battery unit (B1) disposed at the end of the minus output terminal side of series unit 20, is disposed at an inclined posture where end 26 of the minus output terminal side is away from base plate 9A of outer case 9. In the battery system 300 shown in FIGS. 14 to 16, the two pieces of battery units (B1, B2) disposed at the minus output side of series unit 20 are arranged side by side, to constitute battery block 10. Battery unit (B1) disposed at the minus side, is disposed at an inclined posture where end 26 of the minus output terminal side is away from base plate 9A of outer case 9. Therefore, battery unit (B2) arranged side by side, is also disposed at an inclined posture where end 25 of the plus output terminal side is away from base plate 9A of outer case 9. Namely, this battery block 10 is disposed at the inclined posture where the one side portion of this battery block 10 is elevated. The one side portion has both of end 25 of the plus output terminal side and end 26 of the minus output terminal side.

Further, in series units 20 shown in the figures, in each of divided units 21 each including two pieces of battery units (B3, B4)(B5, B6), battery unit (B6, B4) disposed at the plus output side of each of divided units 21, and battery unit (B3, B5) disposed at the minus output side of each of divided units 21, are disposed at the inclined posture in the same way as the above-mentioned battery unit (B8, B7)(B1, B2). Namely, in the four pieces of battery blocks 10 which are disposed in two stages and two columns in FIG. 14, the ends which are disposed at the middle portion in the right and left direction in the figure, are disposed in the inclined postures of the upslope, to ends which are disposed at both ends in the right and left direction in the figure. Then, in all of battery units 2, the ends which are disposed at the middle portion, are away from base plate 9A of outer case 9.

Further, in battery system 300 shown in FIGS. 14 and 15, outer case 9 includes partitioning wall 18 which partitions a bottom portion into a plurality of partitioned spaces 19. Outer case 9 shown in FIG. 15 is provided with partitioning wall 18 which is positioned between battery blocks 10 disposed at right and left. Then, partitioning wall 18 projects upward from base plate 9A. In outer case 9, a two-piece pair each of divided units 21 are disposed in each of partitioned spaces 19 into which partitioning wall 18 partitions. In battery system 300, partitioning wall 18 blocks a current of the coolant stored at the bottom portion of outer case 9 between partitioned spaces 19 at right and left. Therefore, a short circuit between partitioned spaces 19 at right and left, can be prevented surely.

Figure 18:
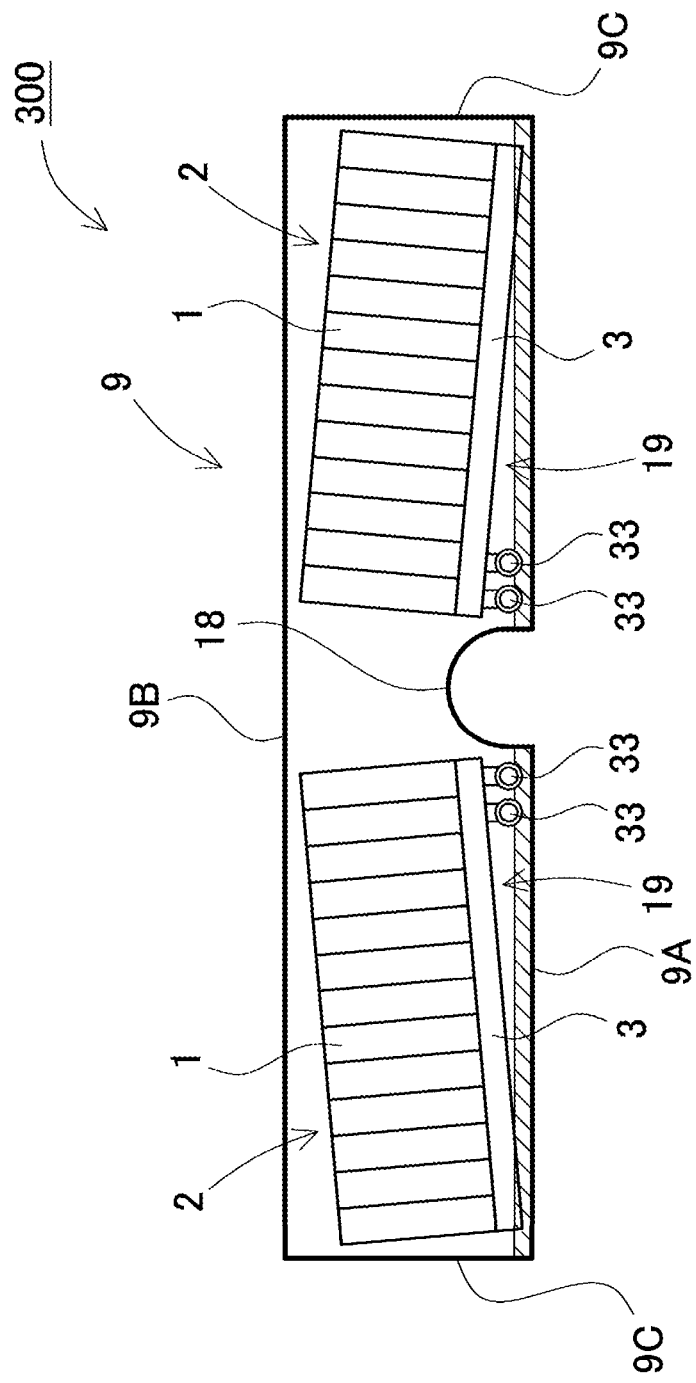
FIG. 18 is a schematic sectional view of a submergence state of the battery system illustrated in FIG. 15.

In above mentioned battery system 100, in a state where the bottom portion of outer case 9 is submerged or immersed as shown in FIG. 18, battery units 2 are submerged or immersed in a region which extends in the front and back direction along both ends at right and left, as shown by hatching in FIG. 17. In this case, as shown in FIG. 17, when the output voltage of each of battery units 2 is E (V), the whole output voltage is 8E (V) in the state where the eight pieces of battery units 2 are connected in series. Further, in battery system 300 shown in the figures, since partitioning wall 18 partitions the bottom portion into the two partitioned spaces 19, the voltage by the four pieces of battery units in each of partitioned spaces 19, is 4E (V). At this time, the maximum voltage difference in the region shown by hatching in FIG. 17, is about 2E (V). Therefore, the maximum voltage difference at the time of submergence can be made substantially a half, compared with a maximum voltage difference 4E (V) within partitioned spaces 19.

Thus, in the battery system, since the coolant stored at the bottom portion is divided by providing partitioning wall 18 at outer case 9, the maximum voltage difference between adjacent partitioned spaces 19 can be made small. Additionally, also in the battery system of the above-mentioned embodiment, the maximum voltage difference can be made small by providing a partitioning wall at the outer case. Then, a short circuit between the divided units disposed in the partitioned spaces can be effectively prevented. For example, in the battery system shown in FIG. 7, the maximum voltage difference is 6E (V). Also in this battery system, the series unit is divided into two parts of the plus and minus sides by providing a partitioning wall at the outer case, and then the maximum voltage difference between the battery units disposed at the partitioned spaces can be made 2E (V). Therefore, the maximum voltage difference at the time of submergence can be made a half, compared with a total maximum voltage difference 4E (V) within each of the partitioned space.

Further, in battery system 300 shown in FIG. 15, cooling pipes 33 are disposed at gaps formed between bottom plate 9A of outer case 9 and battery units 2 disposed at the inclined posture with the ends of the middle portion sides elevated. These cooling pipes 33 can be coupled, for example, through the coupling end portions (not shown in the figure) which projects at the undersurface of heat exchanger 3. Thus, in the structure where cooling pipes 33 are disposed at the gaps formed between bottom plate 9A of outer case 9 and battery units 2 disposed at the inclined posture, the dead space which is made within outer case 9, can be used effectively, to arrange coolant pipes 33 in the space saving way.

The battery system described above are used for various purposes, such as a power supply mounted on a powered vehicle such as a hybrid car or an electric vehicle for supplying power to a travel motor, a power supply for storing power generated by natural energy such as photovoltaic power generation or wind-power generation, or a power supply for storing night power, and are particularly used as a power supply preferable for large power and large current. Examples of a vehicle having a battery system mounted include electric vehicles such as hybrid cars or plug-in hybrid cars driven by both an engine and a motor, or electric-motor driven automobiles such as electric automobiles only driven by a motor. The power supply device can be used for power supplies of these vehicles.

(Battery System for Hybrid Vehicle)

Figure 19:
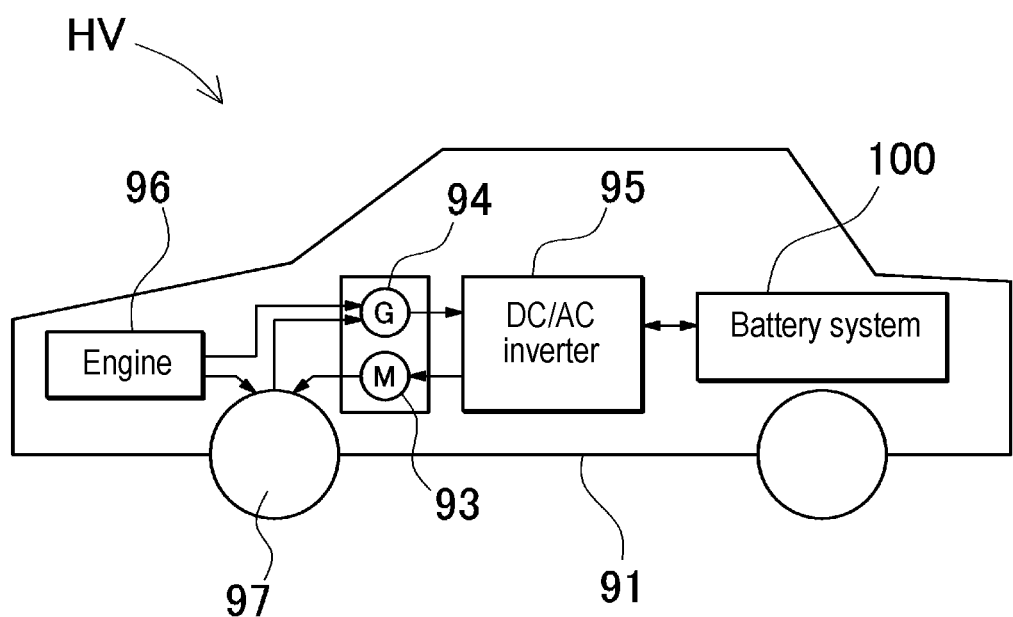
FIG. 19 is a block diagram showing an example in which a battery system is mounted on a hybrid vehicle driven by both an engine and a motor.

FIG. 19 shows an example in which a battery system is mounted on a hybrid car driven by both an engine and a motor. Vehicle HV equipped with a power supply device that is shown in this drawing includes: engine 96 and motor 93 for travel that make vehicle HV travel; battery system 100 for supplying power to motor 93; power generator 94 for charging the battery in battery system 100; vehicle body 91 incorporating engine 9, motor 93, battery system 100, and power generator 94; and wheel 97 actuated by engine 96 and motor 93, for driving vehicle body 91. Battery system 100 is connected to motor 93 and power generator 94 via direct current (DC)/alternating current (AC) inverter 95. Vehicle HV travels by both of motor 93 and engine 96 while charging and discharging the battery of battery system 100. Motor 93 is driven when the engine efficiency is low, for example during acceleration or low-speed travel, and makes the vehicle HV travel. Motor 93 receives power from battery system 100 and is driven. Power generator 94 is driven by engine 96 or is driven by regenerative braking when the vehicle is braked, and the battery of battery system 100 is charged.

(Battery System for Electric Vehicle)

Figure 20:
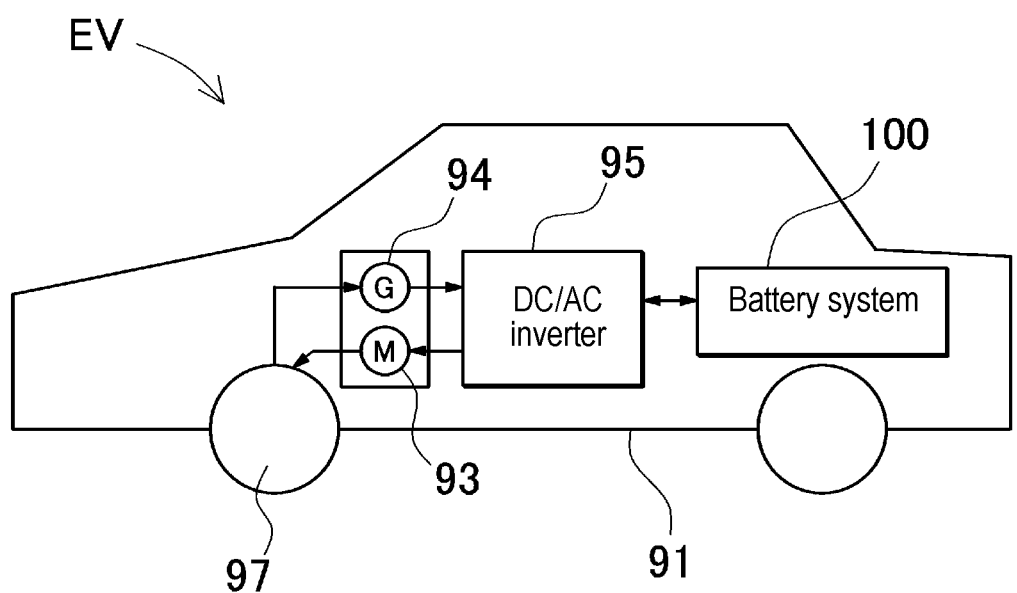
FIG. 20 is a block diagram showing an example in which a battery system is mounted in an electric car traveling only by a motor.

FIG. 20 shows an example in which a battery system is mounted in an electric car traveling only by a motor. Vehicle EV equipped with a power supply device that is shown in this drawing includes: motor 93 for travel that make vehicle EV travel; battery system 100 for supplying power to motor 93; power generator 94 for charging the battery in battery system 100; vehicle body 91 incorporating motor 93, battery system 100, and power generator 94; and wheel 97 actuated by motor 93, for driving vehicle body 91. Battery system 100 is connected to motor 93 and power generator 94 via direct current (DC)/alternating current (AC) inverter 95. Motor 93 receives power from battery system 100 and is driven. Power generator 94 is driven by energy when regenerative braking is applied to vehicle EV, and the battery of battery system 100 is charged.

INDUSTRIAL APPLICABILITY

The battery system according to the present invention can be suitably used as power supply devices of motors for driving vehicles, such as, hybrid vehicles, plug-in hybrid vehicles, and electric vehicles. The power supply device can be appropriately used for the following applications: a backup power supply device mountable in a rack of a computer sever; a backup power supply device used for wireless base stations of mobile phones; a power source for storage used at home or in a factory; an electric storage device combined with a solar battery, such as a power source for street lights; and a backup power source for traffic lights.

The invention claimed is:

1. A battery system, comprising:
a series unit in which a plurality of battery units are connected in series,
each of the battery units having a plus output terminal and a minus output terminal at opposite ends of each of the battery units, and including a plurality of battery cells stacked from the plus output terminal to the minus output terminal;
a heat exchanger coupled with at least one of the battery units in a thermal-coupling state and internally circulating a coolant; and
an outer case housing the series unit and the heat exchanger,
wherein one of the battery units disposed at an end of the plus output terminal side of the series unit, is disposed at an inclined posture where the end of the plus output terminal side is away from a base plate of the outer case, and
another of the battery units disposed at an end of the minus output terminal side of the series unit, is disposed at an inclined posture where the end of the minus output terminal side is away from the base plate of the outer case;
wherein the series unit includes a plurality of divided units connected in series,
at least two of the battery units in each of the plurality of divided units are connected in series and adjacently disposed in a direction perpendicular to a stacked direction of the battery cells,
in one of the divided units disposed at the end of the plus output terminal side of the series unit, the battery unit disposed at the end of the plus output terminal side of the one of the divided units, is disposed at an inclined posture where the end of the plus output terminal side is away from the base plate of the outer case, and the battery unit disposed at the end of the minus output terminal side of the one of the divided units, is disposed at an inclined posture where the end of the minus output terminal side is away from the base plate of the outer case, and
in another of the divided units disposed at the end of the minus output terminal side of the series unit, the battery unit disposed at the end of the minus output terminal side of the another of the divided units, is disposed at an inclined posture where the end of the minus output terminal side is away from the base plate of the outer case, and the battery unit disposed at the end of the plus output terminal side of the another of the divided units, is disposed at an inclined posture where the end of the plus output terminal side is away from the base plate of the outer case;

wherein the outer case includes a partitioning wall which partitions a bottom portion into a plurality of partitioned spaces, the divided units are disposed in the partitioned spaces into which the partitioning wall partitions, and the partitioning wall blocks a current of the coolant stored at the bottom portion of the outer case between the plurality of partitioned spaces.

2. The battery system according to claim 1, wherein the heat exchanger is a cooling plate, the battery unit is disposed along a surface of the cooling plate, and the cooling plate is thermally coupled with the plurality of battery cells.

3. The battery system according to claim 2, wherein a plurality of battery blocks are provided by disposing the battery units at both surfaces of the cooling plate, and the outer case houses the plurality of battery blocks.

4. The battery system according to claim 2, wherein a plurality of battery blocks are provided by disposing the battery units at an upper surface of the cooling plate, and the outer case houses the plurality of battery blocks.

5. The battery system according to claim 4, wherein the plurality of battery blocks are provided by disposing plural lines of the battery units at the upper surface of the cooling plate.

6. The battery system according to claim 3, wherein the plurality of battery blocks are disposed at an inclined posture where a side portion of one side in each of the battery blocks is elevated.

7. The battery system according to claim 6, wherein in the battery block, two of the battery units are arranged in a parallel posture, the battery block is disposed at the inclined posture where one of the battery units is higher than another of the battery units.

8. The battery system according to claim 3, wherein the plurality of battery blocks are disposed at an inclined posture where three corners in a plan view of each of the battery blocks are elevated.

9. The battery system according to claim 1, wherein a cooling pipe which couples the heat exchanger and a cooling mechanism, the cooling pipe is disposed at a gap formed between the bottom plate and the battery unit disposed at the inclined posture.

10. The battery system according to claim 1, wherein a current cut element is disposed at a middle of the series unit, and the current cut element is disposed at a gap formed between a top plate of the outer case and the battery unit disposed at the inclined posture.

11. An electric vehicle having the battery system according to claim 1, wherein the battery system provides power to a motor which drives the electric vehicle.

* * * * *